US012613399B2

(12) United States Patent
Pretorius

(10) Patent No.: US 12,613,399 B2
(45) Date of Patent: Apr. 28, 2026

(54) OPTICAL SYSTEM FOR REDUCING DISTURBING OPTICAL EFFECTS AND FOR CORRECTING VISON DEFECTS

(71) Applicant: Carl Zeiss AG, Oberkochen (DE)

(72) Inventor: Marco Pretorius, Oberkochen (DE)

(73) Assignee: Carl Zeiss AG, Oberkochen (DE)

( * ) Notice: Subject to any disclaimer, the term of this patent is extended or adjusted under 35 U.S.C. 154(b) by 336 days.

(21) Appl. No.: 18/104,160

(22) Filed: Jan. 31, 2023

(65) Prior Publication Data

US 2023/0324660 A1 Oct. 12, 2023

(30) Foreign Application Priority Data

Jan. 31, 2022 (DE) ..................... 10 2022 102 213.7

(51) Int. Cl.
G02B 21/00 (2006.01)
G02B 3/00 (2006.01)
(Continued)

(52) U.S. Cl.
CPC ......... G02B 21/0012 (2013.01); G02B 3/005 (2013.01); G02B 5/1833 (2013.01);
(Continued)

(58) Field of Classification Search
CPC .. G02B 21/0012; G02B 3/005; G02B 5/1833; G02B 7/003; G02B 21/361;
(Continued)

(56) References Cited

U.S. PATENT DOCUMENTS 3,305,294 A 2/1967 Alvarez
3,583,785 A 6/1971 Boardman
(Continued)

FOREIGN PATENT DOCUMENTS

CN 106405818 B 2/2017
CN 106680989 B 5/2017
(Continued)

OTHER PUBLICATIONS

Anonymous "Okular—Wikipedia" , Jun. 4, 2020, XP055907116, URL:https://de.wikipedia.org/w/index.php?title=Okular&oldid=200631767, retrieved on Mar. 30, 2022, and English Language Translation thereof.
(Continued)

*Primary Examiner* — Arnel C Lavarias
(74) *Attorney, Agent, or Firm* — Ewers IP Law PLLC; Falk Ewers

(57) ABSTRACT

An optical system includes a display configured to display an image and including an eyepiece for observing the image. The eyepiece includes a first lens group and a second lens group. An intermediate pupil is arranged between the first lens group and the second lens group. The second lens group is configured to image the image displayed by the display into the intermediate pupil. The first lens group is configured to image the image arranged in the intermediate pupil into a spatial region. The intermediate pupil and the spatial region are conjugate to one another. A filter unit and/or a wavefront manipulator is/are arranged at the intermediate pupil.

20 Claims, 16 Drawing Sheets

(51) Int. Cl.

| | | |
|---|---|---|
| *G02B 5/18* | (2006.01) |
| *G02B 7/00* | (2021.01) |
| *G02B 21/36* | (2006.01) |
| *G02B 27/09* | (2006.01) |

(52) U.S. Cl.
CPC ........... *G02B 7/003* (2013.01); *G02B 21/361* (2013.01); *G02B 21/368* (2013.01); *G02B 27/0955* (2013.01)

(58) Field of Classification Search
CPC .............. G02B 21/368; G02B 27/0093; G02B 27/0955; G02B 3/02; G02B 9/00; G02B 9/04; G02B 9/64; G02B 21/00; G02B 21/0004; G02B 21/36; G02B 25/00; G02B 25/001
USPC ....... 359/368, 362, 363, 369, 381, 423, 434, 359/642, 643, 646, 648, 708, 737, 738, 359/739, 740, 754, 793, 796, 797
See application file for complete search history.

(56) References Cited

U.S. PATENT DOCUMENTS

| | | | |
|---|---|---|---|
| 4,183,624 | A | 1/1980 | Rogers et al. |
| 5,691,850 | A | 11/1997 | Arisaka |
| 5,886,825 | A | 3/1999 | Bietry |
| 6,052,234 | A | 4/2000 | Mukai et al. |
| 6,330,115 | B1 | 12/2001 | Hermanns |
| 6,522,474 | B2 | 2/2003 | Cobb et al. |
| 6,735,018 | B2 | 5/2004 | Kodama et al. |
| 6,912,092 | B2 | 6/2005 | Ukuda |
| 7,158,320 | B2 | 1/2007 | Nishio |
| 7,339,737 | B2 * | 3/2008 | Urey ................... G02B 27/0081 |
| | | | 359/569 |
| 7,841,715 | B1 | 11/2010 | Morrison |
| 8,503,080 | B2 | 8/2013 | Seesselberg et al. |
| 10,082,652 | B2 | 9/2018 | Zhou et al. |
| 2006/0262391 | A1 | 11/2006 | Thomas |
| 2009/0268305 | A1 | 10/2009 | Pretorius |
| 2013/0083396 | A1 | 4/2013 | Pretorius et al. |
| 2014/0218806 | A1 | 8/2014 | Shizuka |
| 2016/0062105 | A1 | 3/2016 | Kawamura et al. |
| 2016/0195707 | A1 | 7/2016 | Ishizuka et al. |
| 2016/0357003 | A1 * | 12/2016 | Hauger ................ G02B 21/361 |
| 2017/0299783 | A1 | 10/2017 | Schnitzler et al. |
| 2017/0307860 | A1 | 10/2017 | Pretorius et al. |
| 2017/0336609 | A1 | 11/2017 | Lerner et al. |
| 2018/0052383 | A1 | 2/2018 | Miyagishima et al. |
| 2019/0170991 | A1 | 6/2019 | Seesselberg et al. |
| 2020/0049992 | A1 | 2/2020 | Peng et al. |
| 2020/0201020 | A1 | 6/2020 | Fiedler |
| 2023/0333364 | A1 * | 10/2023 | Epple ................... G02B 25/001 |

FOREIGN PATENT DOCUMENTS

| | | | |
|---|---|---|---|
| CN | 111358419 | A | 7/2020 |
| DE | 19746925 | C1 | 10/1998 |
| DE | 69229700 | T2 | 12/1999 |
| DE | 102008021341 | A1 | 11/2009 |
| DE | 102011054087 | A1 | 4/2013 |
| DE | 102012101262 | B3 | 4/2013 |
| DE | 102011055777 | B4 | 2/2015 |
| DE | 102014114468 | A1 | 4/2016 |
| DE | 102014118383 | A1 | 6/2016 |
| DE | 102015119255 | A1 | 5/2017 |
| DE | 102016214695 | B3 | 10/2017 |
| EP | 534711 | B1 | 8/1999 |
| EP | 1267197 | B1 | 3/2005 |
| EP | 1746451 | A2 | 1/2007 |
| JP | 2016051064 | A | 4/2016 |
| JP | 2016051065 | A | 4/2016 |
| RU | 2652660 | C1 | 4/2018 |
| WO | 9509560 | A1 | 4/1995 |
| WO | 2013079312 | A1 | 6/2013 |
| WO | 2013120800 | A1 | 8/2013 |

OTHER PUBLICATIONS

Anonymous "Tutorial: Telezentrische Objektive" , Sep. 11, 2018, XP055907140, URL:https://web.archive.org/web/20180911151945/https://www.opto-e.de/ressourcen/tutorialtelezentrische- objektive, retrieved on Mar. 30, 2022, and English Language Translation thereof.

Palusinski et al., "Lateral-shift variable aberration generators" in Applied Optics https://doi.org/10.1364/AO.38.000086, vol. 38 (1999), pp. 86-90 (Abstract Only so far), in English.

Merlitz, "Distortion of binoculars revisited: Does the sweet spot exist?" , J. Opt. Soc. Am. A, vol. 27, No. 1, (Jan. 2010).

Office Action issued in German Patent Application No. DE 10 2022 102 213.7, dated Sep. 29, 2022 (from which this application claims priority) and English language translation thereof.

Lohmann, "A New Class of Varifocal Lenses" article published in Applied Optics, Jul. 1970, pp. 1669-1671, vol. 9, No. 7, Department of Applied Physics and Information Science, University of California at San Diego, La Jolla, California, U.S.A.

Barton et al., "Diffractive Alvarez lens," article published in Optics Letters (OCIS codes: 050.1970, 220.3630, 220.3620, 220.1000, 010.1080), Jan. 1, 2000, pp. 1-3, vol. 25, No. 1, Lawrence Livermore National Laboratory, Livermore, California, U.S.A.

Werdehausen et al., "Dispersion-engineered nanocomposites enable achromatic diffractive optical elements", research article published in Optica, Aug. 2019, pp. 1031-1038, vol. 6, No. 8, https://doi.org/10.1364/OPTICA.6.001031, Optical Society of America, Corporate Research & Technology, Carl Zeiss AG, Jena, Germany.

Palusinski et al., "Lateral-shift variable aberration generators" published in Applied Optics, Jan. 1, 1999, pp. 86-90, vol. 38, No. 1, Optical Society of America, (OCIS codes: 080.3620, 220.1010, 220.1250), Optical Science Center, University of Arizona, Tucson, Arizona, U.S.A.

* cited by examiner

| Surface | Surface type | RADIUS [mm] | THICKNESS [mm] | MATERIAL | HALF DIAMETER [mm] |
|---|---|---|---|---|---|
| 0 | spherical | infinity (0) | | | 3.30 |
| 1 | spherical | infinity (0) | 18.394370 | | 13.99 |
| 2 | aspherical | infinity (0) | 3.100000 | SLAH66V | 14.22 |
| 3 | aspherical | -62.290631 | 0.200000 | | 14.95 |
| 4 | aspherical | 30.266950 | 7.147947 | SFPL51 | 14.92 |
| 5 | aspherical | -30.145389 | 10.460108 | | 12.85 |
| 6 | aspherical | 17.837560 | 7.084380 | SFPL51 | 12.36 |
| 7 | aspherical | 260.017356 | 2.500000 | | 12.36 |
| 8 | spherical | infinity (0) | 1.320000 | | 11.23 |
| 9 | aspherical | 10.148112 | 5.480448 | LLAH98 | 8.46 |
| 10 | aspherical | 113.128668 | 0.300000 | | 8.28 |
| 11 | aspherical | 768460.296497 | 1.500000 | NBASF2 (Schott) | 8.04 |
| 12 | aspherical | 4.820927 | 5.718386 | | 4.46 |
| 13 | aspherical | -3.585127 | 8.794479 | NLASF41 (Schott) | 4.41 |
| 14 | aspherical | -9.158606 | 0.200000 | | 7.30 |
| 15 | spherical | 45.281369 | 3.108166 | SLAH66 | 7.76 |
| 16 | spherical | -24.789728 | 4.700086 | | 7.73 |
| 17 | spherical | infinity (0) | 0.749971 | | 5.50 |
| 18 | spherical | 13.868548 | 3.789878 | SFPL51 | 5.80 |
| 19 | spherical | -49.232726 | 0.511347 | | 5.87 |
| 20 | spherical | 75.827371 | 1.500000 | STIH13 | 5.79 |
| 21 | spherical | 7.201321 | 4.308067 | SFPL51 | 5.49 |
| 22 | spherical | -28.239906 | 0.200000 | | 5.62 |
| 23 | spherical | 18.393252 | 1.500000 | STIH53 | 5.70 |
| 24 | spherical | 8.286098 | 3.129225 | SLAH59 | 5.31 |
| 25 | spherical | 14.179635 | 4.716014 | SNPH1 | 5.30 |
| 26 | spherical | -5.934183 | 5.837331 | SNPH1 | 5.20 |
| 27 | aspherical | -9.985202 | 0.100000 | | 8.49 |
| 28 | aspherical | 24.874386 | 3.672545 | SNPH1 | 10.38 |
| 29 | aspherical | infinity (0) | 3.000000 | | 10.30 |
| 30 | spherical | infinity (0) | 0.000000 | | |

FIG. 3

Asphere coefficients

| Surface | 2 | 3 | 4 | 5 | 6 | 7 | 9 | 10 |
|---|---|---|---|---|---|---|---|---|
| K | 0 | 0 | 0 | 0 | 0 | 0 | 0 | 0 |
| C1 | -0.813486E-05 | 0.318072E-06 | -0.300236E-04 | -0.734132E-05 | 0.480321E-04 | 0.470866E-05 | -0.118067E-03 | 0.598293E-05 |
| C2 | -0.386767E-07 | -0.113091E-06 | 0.196635E-06 | 0.718653E-07 | -0.660411E-07 | 0.214046E-07 | -0.283385E-05 | -0.600000E+00 |
| C3 | 0.339829E-10 | 0.108119E-10 | 0.108319E-08 | 0.103072E-08 | 0.157024E-08 | 0.393197E-10 | 0.374036E-07 | -0.103989E-08 |

| Surface | 11 | 12 | 13 | 14 | 20 | 21 | 22 | |
|---|---|---|---|---|---|---|---|---|
| K | 0 | 0 | 0 | 0 | 0 | 0 | 0 | |
| C1 | 0.148981E-03 | 0.198718E-03 | -0.378101E-03 | 0.368988E-04 | -0.608084E-04 | 0.688101E-04 | | |
| C2 | -0.198817E-06 | 0.369070E-06 | -0.133331E-04 | 0.311358E-05 | 0.854664E-06 | 0.459766E-06 | | |
| C3 | -0.471401E-08 | -0.338113E-08 | 0.864093E-08 | 0.198669E-08 | 0.884608E-08 | 0.108114E-08 | | |

FIG. 4

OPTICAL SYSTEM FOR REDUCING DISTURBING OPTICAL EFFECTS AND FOR CORRECTING VISON DEFECTS

CROSS REFERENCE TO RELATED APPLICATIONS

This application claims priority to German patent application No. 10 2022 102 213.7, filed on Jan. 31, 2022, the entire content of which is incorporated herein by reference.

TECHNICAL FIELD

The disclosure relates to an optical system including a display unit for displaying an image and an eyepiece for observing the image. By way of example, the display unit is embodied as a digital display unit. In particular, the optical system according to the disclosure is arranged in a pair of field glasses, in a refractor, in a telescope, in a spotting scope, in a light microscope, in digital-optical equipment for use in surgery, in an augmented reality device, in a virtual reality device, and/or in night vision equipment. In particular, the optical system according to the disclosure is arranged in a digital microscope, in particular in a digital surgical microscope.

BACKGROUND

An eyepiece is an optically effective unit of an optical system and is arranged on the side of the eye. By way of example, the eyepiece is used to virtually image a real intermediate image of an image representation for a human eye. An eyepiece is used in many ways, for example in a pair of field glasses, in a refractor, in a telescope, in a spotting scope, in a light microscope or in night vision equipment. Further, the arrangement of an eyepiece in a digital microscope, in particular in a digital surgical microscope, is known. By way of example, a visual display unit of the digital microscope is observed using the eyepiece. An image produced by a detector is presented on this visual display unit. Signals detected by the detector are electronically converted so that they are recognizable as an image on the visual display unit.

To ensure the most comfortable viewing possible for a person, in particular for a spectacle wearer, it is desirable for the eyepiece to have both a large pupil distance (for example, of approx. 18 mm) for an eye pupil with a diameter of 5 mm and a large half field angle (for example, of approx. 27°). Here, the pupil distance is the distance between the eye pupil and the first optical surface of the eyepiece.

With regard to the prior art, reference is made to US 2006/0262391 A1, EP 1 746 451 A2, US 2017/0336609 A1, and EP 1 267 197 Bl.

The prior art describes an optical system for observing a digital display unit for displaying an image. The known optical system is used to produce a sharp virtual image of the image presented on the digital display unit in an eye of an observer. In this case, it is desirable that the eye of the observer (and hence the eye pupil), as an effective boundary for the light beams emanating from the digital display unit, should be able to move within a predefined spatial region without a noticeable deterioration in the image quality. Among experts, this spatial region is often referred to as an "eye box".

Further, the prior art describes an optical system including an eyepiece and an objective, with the known optical system not having a digital display unit. In this known optical system, which is also referred to as "conventional optical system" below, an intermediate image produced by the objective is imaged into the eye pupil of the observer or into the eye box as a virtual image. However, the boundary of an objective pupil in such a conventional optical system including an eyepiece and an objective simultaneously acts as a sharp boundary of the eye box, which can consequently also be referred to as "conjugate equipment pupil". The presence of the conjugate equipment pupil causes the observer to quickly perceive image trimming when they move their eye laterally outside of a respectively predefined tolerance range. This provides the observer with the information that they have departed from the predefined spatial region of the conjugate equipment pupil (i.e., the eye box), for which the conventional optical system, in accordance with its design, can still ensure a sharp image representation. Further, the observer is simultaneously informed with regards to the direction in which the eye pupil has to move in order to be located within the conjugate equipment pupil (i.e., the eye box) again.

An optical system with a digital display unit lacks such a conjugate equipment pupil since the light beams emitted by the digital display unit are in each case emitted into a broad and not sharply delimited solid angle range and are not, like in the case of a conventional optical system composed of objective and eyepiece, delimited by one or more stops of the objective, with finite edges of lenses of the objective also being able to be stops within this meaning. In the case of a known optical system with a digital display unit, this has as a consequence that the observer, when their eye position is laterally offset relative to the optical axis of this known optical system, perceives an unquestionably unsharp image when an admissible tolerance range is exceeded—i.e., when the eye box has been departed from—but this occurs (i) without a substantial reduction in the image brightness and/or (ii) without a partial or complete trimming of the perceived image. As it were, the eye of the observer is thus lacking the "guidance" by a clearly perceivable equipment pupil. Instead, the observer only perceives an unsharp image optionally containing unquestionable bothersome chromatic aberrations (in particular, color profiles over the image) and cannot unambiguously trace the cause of this back to their incorrect eye pupil position. This lack of guidance information for an eye of an observer can be perceived to be very bothersome and, in a worst-case scenario, may lead to the use of the known optical system including a digital display unit being refused.

In the case of an optical system including a digital display unit, disturbing effects may occur in the form of aliasing effects and, on account of a perceivability, moiré-type effects, which are caused by a regular pixel arrangement on the display unit. Such disturbing effects lead to an observer not considering the use of an optical system including a digital display unit since the image displayed on the display unit is perceived to be less steady and less natural by the observer in comparison with that of a conventional optical system, for example a refractor or a pair of field glasses. On account of this perception, an observer loses the feeling of immediacy of the perception, which is also referred to as immersion or presence. The loss of perception is undesirable since the optical system with the digital display unit should provide the observer with good presence. It is known to provide means in an eyepiece for adapting to a vision defect within a small adjustment range, for example by way of a displacement of the entire eyepiece relative to the image plane. Both above and below, a vision defect of the observer is understood to mean here any vision defect caused by the nature of one eye or of both eyes of an observer, in particular myopia, hyperopia or an astigmatic vision defect of variable power and axis. However, a substantially complete correction of all individual vision defects of an observer is usually only possible by way of wearing a pair of spectacles matched to the observer. However, wearing a pair of spectacles when using an eyepiece is not very comfortable and often also bothersome. Moreover, the eyepiece should be designed with a very large exit pupil distance. An exit pupil distance ranging from 18 mm to 22 mm is often desired for eyepieces used in optical equipment in the field of medical engineering. Since the eyepiece should also transform the image of the display unit into a virtual image with strong magnification (and in the process should additionally provide an eye box that is as large as possible), it should have a large light conductance.

These desired preconditions make the construction of an eyepiece which should have a good image quality more difficult.

SUMMARY

It is an object of the disclosure to provide an optical system including a display unit, in particular a digital display unit, in which disturbing effects are reduced such that a good presence is obtainable and a visual image impression is influenceable in targeted fashion. Further, the optical system should be embodied such that a correction of any vision defects of an observer is made possible.

The object is achieved by an optical system and an optical device having an optical system, as described herein.

The optical system according to an aspect of the disclosure includes a display unit for displaying an image. By way of example, the optical system according to the aspect of the disclosure has a reference axis, with the display unit being arranged on the reference axis. By way of example, the reference axis is an optical axis of the optical system according to an aspect of the disclosure. By way of example, the display unit is a digital display unit. In particular, a field emission visual display unit, a liquid crystal visual display unit, a thin film transistor visual display unit, a plasma visual display unit, a surface conduction electron emitter display (SED), or a visual display unit containing organic light-emitting diodes can be used as a display unit. The above enumeration is not exhaustive. Rather, any display unit suitable for the disclosure can be used.

Moreover, the optical system according to an aspect of the disclosure includes an eyepiece for observing the image using at least one eye. Should the optical system according to an aspect of the disclosure have a reference axis, then the reference axis for example runs through the eyepiece. As specified above, the reference axis for example is the optical axis of the optical system according to an aspect of the disclosure. Further, a pre-definable spatial region is arranged at the eyepiece, in which spatial region the eye can move in such a way without a pre-definable threshold value of an image quality of an image representation of the image produced by the eyepiece being undershot. By way of example, the spatial region has a first longitudinal extent and a second longitudinal extent. The first longitudinal extent is the width of the spatial region, for example. Further, the second longitudinal extent is the height of the spatial region, for example. The first longitudinal extent is for example at least 5 mm, typically at least 7 mm. The second longitudinal extent is also for example at least 5 mm, typically at least 7 mm. By way of example, the first longitudinal extent is longer than the second longitudinal extent. By way of example, the spatial region is determined by the shape and the size of an aperture unit arranged at an intermediate pupil. The intermediate pupil will be discussed in more detail further below. The pre-determinable region is the eye box, which has already been defined further above. As seen in the direction of the spatial region starting from the display unit, the display unit is arranged first in a light incidence direction, followed by the eyepiece and then the spatial region.

The eyepiece of the optical system according to an aspect of the disclosure includes at least a first lens group and at least a second lens group, wherein, as seen in a direction opposite to the light incidence direction, the first lens group is arranged first, followed by the second lens group. By way of example, the first lens group and the second lens group are arranged along the reference axis, in particular the optical axis. The first lens group may also be referred to as a pupil relay unit. A lens group is understood to mean a group containing at least one optical assembly, for example in the form of a lens. In particular, provision is made for the lens group to include only a single lens or a plurality of lenses.

Further, an intermediate pupil is arranged between the first lens group and the second lens group. Expressed differently, the eyepiece is configured such that the aforementioned intermediate pupil arises between the first lens group and the second lens group. Expressed yet again differently, the eyepiece is embodied to form the aforementioned intermediate pupil between the first lens group and the second lens group. The second lens group is configured to image the image displayed by the display unit into the intermediate pupil. Moreover, the first lens group is configured to image the image arranged in the intermediate pupil into the spatial region. The intermediate pupil and the spatial region are conjugate to one another. Further, a filter unit (or at least one filter unit) and/or a wavefront manipulator (or at least one wavefront manipulator) is/are arranged at the intermediate pupil. Expressed differently, the filter unit and/or the wavefront manipulator is/are arranged in a plane at the location of the intermediate pupil.

In this case, both above and below, a filter unit is understood to be a unit which influences the amplitude and/or the polarization of a light beam, for example. Further, both above and below, a wavefront manipulator is understood to be a unit which influences the wavefront of a light beam. Attention is drawn explicitly to the fact that the wavefront manipulator is simultaneously also embodied as a filter unit in an exemplary embodiment of the disclosure.

By way of example, the wavefront manipulator includes at least two optical components (which are also referred to as optical units), which are arranged to be displaceable in opposite directions to one another, in particular perpendicularly to an optical axis of the optical system, and which each have a free-form surface. The aforementioned exemplary embodiment of the wavefront manipulator has a zero position, in which the optical components thereof do not cause any image aberrations in the imaging properties of the optical system. Further, the aforementioned exemplary embodiment of the wavefront manipulator has effective positions, in which the optical components are displaced from the zero position in opposite directions to one another, in particular perpendicularly to an optical axis of the optical system, and in which the optical components cause at least a spherical aberration in the imaging properties of the optical system. The aforementioned exemplary embodiment of the wave manipulator renders it possible to influence the spherical aberration at a predetermined reference wavelength in a targeted manner and, in the process, leave other monochromatic image aberrations such as coma and astigmatism uninfluenced. In particular, any desired, fixedly predefined linear combination of Zernike coefficients which describe the various orders of spherical aberration may be influenced in an adjustable manner with the aid of the aforementioned embodiment of the wavefront manipulator. In this way, it is possible to influence specific spatial frequency regions of a modulation transfer function in the optical system in a targeted manner and, in particular, also dampen these in a suitable manner such that a soft-focus effect, which is adjustable in terms of strength, arises. Consequently, the aforementioned exemplary embodiment of the wavefront manipulator also includes the function of a filter unit, in particular an optical low-pass filter, with the filter unit being variably adjustable. Moreover, the sign of the produced spherical aberration may be reversed without problems, as a result of which different effects emerge in the foreground and background, which effects may likewise be used for artistic purposes. Here, the sign is reversed by reversing the movement direction of the optical components of the aforementioned exemplary embodiment of the wavefront manipulator. In respect of details relating to the aforementioned exemplary embodiment of the wavefront manipulator, reference is also made to DE 10 2014 118 383 A1, the content of which is incorporated in this patent application in full by reference.

A targeted spherical aberration for the soft focus is brought about with the aforementioned exemplary embodiment of the wave manipulator. However, it is also possible to bring about bokeh. In particular, what should be highlighted here is that the aforementioned exemplary embodiment of the wave manipulator opens up the possibility of blurring either the foreground or the background of an object with the aid of a negative spherical aberration or a positive spherical aberration by virtue of the movement direction of the optical components with the free-form surfaces being reversed. Consequently, the arrangement of the aforementioned exemplary embodiment of the wavefront manipulator including the function of the filter unit at the intermediate pupil affords a positive influence on the perception of the image quality, since the image perceived by the observer appears soft and natural. Moreover, the filter unit renders it possible to highlight or suppress desired structures in the image perceived by the observer, in order to obtain a desired image effect. Further, bringing about a targeted spherical aberration may also be used for bringing about anti-aliasing. Moreover, it is possible to suppress disturbing moiré effects or unwanted fine image structures on a suitable display or monitor already directly before the recording and hence it is possible to set a desired image effect in a targeted manner.

The optical system according to an aspect of the disclosure ensures that, for each display unit to be inserted into the optical system, a filter unit suitable for this display unit can be arranged at the intermediate pupil in order to reduce the aforementioned disturbing effects and/or in order to obtain a particularly good perception of the image.

Further, the arrangement of the filter unit at the intermediate pupil affords a positive influence on the perception of the image quality, since the image perceived by the observer appears soft and natural. Moreover, the filter unit renders it possible to highlight or suppress desired structures in the image perceived by the observer, in order to obtain a desired image effect.

It was found that the pupil image representation produced by the first lens group and arranged between the spatial region and the intermediate pupil, for example, should desirably only have small aberrations such that a one-to-one correspondence is made possible between locations in the spatial regions and locations in the plane of the filter unit. Such a virtually error-free pupil image representation can be obtained for example by a pure lens optical unit, by a pure free-form mirror optical unit, or by a catadioptric system.

As a result of arranging the wavefront manipulator at the intermediate pupil, it is possible to correct individual vision defects (vision disorders) of an observer in the intermediate pupil. This has the following background. As a matter of principle, a pair of spectacles can only compensate vision defects completely for a single fixed viewing direction, but not for a relatively large visual field for the gazing eye. This is due to the fact that the region of a spectacle lens through which the visual field beams pass changes when the viewing direction is changed. However, since the spectacle lens should form a contiguous continuous surface, it is not possible to simultaneously correct all higher order image aberrations for all viewing directions. However, this is rendered possible by a contact lens which moves together with the eye when the viewing direction changes. The vision defect correction according to an aspect of the disclosure in the conjugate intermediate pupil therefore tends, in terms of the correction options, to correspond to a contact lens rather than a pair of spectacles, that is to say a correction of the vision disorders is possible in virtually complete fashion and independently of the viewing direction. The disclosure therefore ensures an alternative or additional option for correcting individual vision defects of an observer. In principle, the correction in the intermediate pupil can be implemented independently of the viewing direction and hence for all viewing directions. It was found that a better and more complete correction is afforded than in the case of a spectacle lens situated at a finite distance in front of the eye of the observer.

Wearing a pair of spectacles may be bothersome per se. By way of example, the spectacle lens or the spectacle lenses of the pair of spectacles bump against an eye cup, as a result of which the spectacle lens or the spectacle lenses may be dirtied, or a spectacle temple presses against the ear. A user (i.e., an observer) need not necessarily wear a pair of spectacles for the optical system according to an aspect of the disclosure. Rather, the optical system according to an aspect of the disclosure can also be used by a user without wearing a pair of spectacles. This increases user comfort. This is very advantageous, in particular, when using the optical system according to an aspect of the disclosure in the form of a digital microscope, in particular a digital surgical microscope, since the disclosure allows an effortless and comfortable use. Further, a viewing angle-independent and qualitatively good correction option is made available.

In view of the wavefront manipulator, it is also desirable that the first lens group should have only small aberrations. As mentioned above, a virtually error-free pupil image representation can be obtained for example by a pure lens optical unit, by a pure free-form mirror optical unit, or by a catadioptric system.

The exit pupil distance of the eyepiece can be shorter in the optical system according to an aspect of the disclosure than the exit pupil distance ranging from 18 mm to 22 mm otherwise typically to be slated for a spectacles-wearing user (i.e., for an observer) in the prior art. This facilitates the configuration of eyepieces with a very large light conductance. In particular, the exit pupil distance in the case of the optical system according to an aspect of the disclosure may also be less than 18 mm since the additional distance between eye and pair of spectacles is dispensed with. By way of example, the exit pupil distance is of the order of 12 mm.

Consequently, in comparison with previously known conventional optical systems, the optical system according to an aspect of the disclosure ensures an overall better corrected, sharper image which can be observed in more relaxed fashion.

In an exemplary embodiment of the optical system according to an aspect of the disclosure, provision is additionally or alternatively made for the optical system to include at least a first drive unit for moving the filter unit. The first drive unit is operatively arranged at the filter unit. The filter unit is embodied to be movable such that the filter unit can be moved from a first filter unit position outside of the intermediate pupil to a second filter unit position at the intermediate pupil. Expressed differently, the filter unit can be moved from the first filter unit position to the second filter unit position. In addition or as an alternative thereto, provision is made for the filter unit to be able to be moved from the second filter unit position to the first filter unit position. The first drive unit is embodied as a mechanical and/or electrical drive unit, for example. In particular, provision is made for the filter unit to be pivoted from the first filter unit position into the second filter unit position at the intermediate pupil or be pivoted out of the intermediate pupil from the second filter unit position into the first filter unit position.

In a further exemplary embodiment of the optical system according to an aspect of the disclosure, provision is additionally or alternatively made for the optical system to include at least a second drive unit for moving the wavefront manipulator. The second drive unit is operatively arranged at the wavefront manipulator. The wavefront manipulator is embodied to be movable such that the wavefront manipulator can be moved from a first wavefront manipulator position outside of the intermediate pupil to a second wavefront manipulator position at the intermediate pupil. Expressed differently, the wavefront manipulator can be moved from the first wavefront manipulator position to the second wavefront manipulator position. In addition or as an alternative thereto, provision is made for the wavefront manipulator to be able to be moved from the second wavefront manipulator position to the first wavefront manipulator position. The second drive unit is embodied as a mechanical and/or electrical drive unit, for example. In particular, provision is made for the wavefront manipulator to be pivoted from the first wavefront manipulator position into the second wavefront manipulator position at the intermediate pupil or be pivoted out of the intermediate pupil from the second wavefront manipulator position into the first wavefront manipulator position.

In an even further exemplary embodiment of the optical system according to an aspect of the disclosure, provision is additionally or alternatively made for the filter unit to be embodied as an anti-aliasing filter. By way of example, the anti-aliasing filter includes a birefringent plate or birefringent layers. The birefringence of the birefringent plate or of the birefringent layers can be chosen such that a modulation transfer function of the optical system according to an aspect of the disclosure is damped in targeted fashion beyond the Nyquist frequency or beyond a fraction of the Nyquist frequency. Optical assemblies having birefringent layers or birefringent plates made of quartz or lithium niobate are already known from the prior art. The aforementioned filter units are particularly well suited to reduce disturbing effects in the form of aliasing effects and, on account of a perceivability, moiré-type effects.

In yet a further exemplary embodiment of the optical system according to an aspect of the disclosure, provision is additionally or alternatively made for the filter unit to be embodied as an apodization filter. An apodization filter is a graduated filter with a radially varying transmission, the curve of which follows a Gaussian function, for example. By way of example, the light intensity in higher orders of diffraction of a point spread function is suppressed with an apodization filter. In the optical system according to an aspect of the disclosure, this has a positive effect on the perception of the image quality, with the result that an image appears soft and natural.

In an exemplary embodiment of the optical system according to an aspect of the disclosure, provision is additionally or alternatively made for the filter unit to be embodied as an optical spatial frequency filter. Using an optical spatial frequency filter, it is possible to obtain a desired image effect, for example the highlighting or suppression of specific structures in the image perceived by the observer. The structures correspond to certain Fourier components (spatial frequency components) in the pupil plane.

In a further exemplary embodiment of the optical system according to an aspect of the disclosure, provision is additionally or alternatively made for the wavefront manipulator to be embodied as a static wavefront manipulator. In this context, both above and below, a static wavefront manipulator is understood to mean a wavefront manipulator which corrects vision defects (vision disorders) of a specific observer. Expressed differently, the static wavefront manipulator is provided only for a single observer. By way of example, the static wavefront manipulator includes at least one lens unit. In this context, both above and below, a lens unit is understood to be a unit which includes at least one lens. In particular, provision is made for the lens unit to include only a single lens or a plurality of lenses. In an exemplary embodiment of the static wavefront manipulator, the wavefront manipulator includes at least a first lens unit and at least a second lens unit. The first lens unit has a first spherical power and/or a first cylindrical power. By contrast, the second lens unit has a second spherical power and/or a second cylindrical power. Further, at least one of the following features holds true: (a) the first spherical power is different from the second spherical power; (b) the first cylindrical power is different from the second cylindrical power. In a further exemplary embodiment of the static wavefront manipulator, the wavefront manipulator includes at least one phase plate. As already explained above, each of the embodiments of the aforementioned static wavefront manipulators is always used for a single observer.

In an even further exemplary embodiment of the optical system according to an aspect of the disclosure, provision is additionally or alternatively made for the wavefront manipulator to be embodied as an adjustable wavefront manipulator. In this context, both above and below, an adjustable wavefront manipulator is understood to mean a wavefront manipulator whose manipulation properties in relation to a wavefront are adjustable, for example by adjusting the refractive power of the wavefront manipulator and/or by moving the wavefront manipulator. In particular, provision is made for the adjustable wavefront manipulator to include at least one liquid lens unit. The refractive power of the liquid lens unit is variably adjustable. In this context, both above and below, a liquid lens unit is understood to be a unit which includes at least one liquid lens. In particular, provision is made for the liquid lens unit to include only a single liquid lens or a plurality of liquid lenses. In addition or as an alternative thereto, provision is made for the adjustable wavefront manipulator to include at least one elastopolymer lens unit. The refractive power of the elastopolymer lens unit is variably adjustable. In this context, both above and below, an elastopolymer lens unit is understood to be a unit which includes at least one elastopolymer lens. In particular, provision is made for the elastopolymer lens unit to include only a single elastopolymer lens or a plurality of elastopolymer lenses. Once again, additionally or as an alternative thereto, provision is made for the adjustable wavefront manipulator to include a Stokes cell. In this exemplary embodiment of the adjustable wavefront manipulator, the wavefront manipulator includes at least a first lens unit and at least a second lens unit. The first lens unit is embodied as a first cylindrical lens unit. By contrast, the second lens unit is embodied as a second cylindrical lens unit. The first lens unit and the second lens unit are arranged on the optical axis, for example. Further, the first lens unit and the second lens unit are embodied to be rotatable relative to one another. By changing the angle of rotation of the first lens unit relative to the second lens unit, it is possible to influence the strength and axis of an astigmatic wavefront and consequently to compensate, that is to say correct, the astigmatism of an observer.

In yet a further exemplary embodiment of the optical system according to an aspect of the disclosure, provision is additionally or alternatively made for the wavefront manipulator to be embodied as an adjustable wavefront manipulator. The wavefront manipulator includes at least a first optical unit and at least a second optical unit. By way of example, the first optical unit is embodied as a first optical plate and/or the second optical unit is embodied as a second optical plate. In particular, provision is made for the first optical unit and/or the second optical unit to be made of plastic and/or glass, in particular mineral glass. By way of example, the first optical unit and the second optical unit are arranged successively in the light incidence direction or opposite to the light incidence direction along the optical axis. Further, the first optical unit and the second optical unit each are arranged so as to be able to be moved relative to one another in a movement direction perpendicular to a reference axis, for example the optical axis of the optical system. The first optical unit and the second optical unit each include at least one refractive free-form surface. The aforementioned exemplary embodiment of the adjustable wavefront manipulator is also known as an Alvarez element. In respect of details relating to the exemplary embodiment, in particular the exemplary embodiment of the free-form surfaces, reference is made to DE 10 2012 101 262 B3 and U.S. Pat. No. 3,305,294 A, the content of which is incorporated in this patent application in full by reference. Further, reference is made to the publication by I. A. Palusinski et al., "Lateral-shift variable aberration generators" in Applied Optics, volume 38 (1999), pages 86 to 90, the content of which is likewise incorporated in this patent application in full by reference.

In an exemplary embodiment of the adjustable wavefront manipulator including the first optical unit and the second optical unit, provision is made for an immersion medium to be arranged between the first optical unit and the second optical unit, with the immersion medium being in contact with both the first optical unit and the second optical unit. By way of example, the immersion medium is in the form of a liquid, in particular as high-purity water, as organic hydrocarbon, as a saline solution, or as an immersion oil. The above enumeration should not be construed as exhaustive. Instead, any immersion medium that is suitable for the disclosure is usable for the disclosure. In a further exemplary embodiment, provision is made for the immersion medium to be in the form of an elastic optical cement. The first optical unit is arranged at the second optical unit with the elastic optical cement.

In an exemplary embodiment of the optical system according to an aspect of the disclosure, provision is made for the wavefront manipulator to be adjustable and to be embodied as presented below. In this exemplary embodiment, the wavefront manipulator includes at least a first optical component (i.e., a first optical unit) and at least a second optical component (i.e., a second optical unit) which are arranged successively along a reference axis, with the first optical component and the second optical component being arranged so as to be able to be moved relative to one another perpendicular to the reference axis. The first optical component and the second optical component each include a first optical element and at least a further optical element with deviating refractive index progressions $n_1(\lambda)$ and $n_1(\lambda)$, the optical elements being arranged successively along the reference axis. In relation to local coordinates x and y of the optical component, the optical elements have a location-dependent length in the z-direction parallel to the reference axis, where the index i denotes the optical element.

In a further exemplary embodiment of the optical system according to an aspect of the disclosure, provision is made for the wavefront manipulator to be adjustable and to be embodied as presented below. In this exemplary embodiment, the wavefront manipulator includes at least a first optical component (i.e., a first optical unit) and at least a second optical component (i.e., a second optical unit) which are arranged successively along a reference axis. The first optical component and the second optical component are arranged so as to be movable relative to one another in a plane perpendicular to the reference axis. The first optical component and the second optical component each include a first optical element having at least one free-form surface, a refractive index $n_1$, and an Abbe number $v_1$ and a second optical element having at least one free-form surface, a refractive index $n_2$, and an Abbe number $v_2$, which optical components are arranged successively along the reference axis. The Abbe numbers $v_1$ and $v_2$ differ from one another ($v_1 \neq v_2$).

The aforementioned exemplary embodiments of the wavefront manipulator are based on the following considerations. Every spherocylindrical vision defect of an eye can be corrected using a single wavefront manipulator including two free-form plates with free-form profiles. The free-form profiles can be described by way of the following polynomial:

$$z(x, y) = K \cdot \left( x^2 \cdot y + \frac{y^3}{3} \right) \qquad [1]$$

In respect of further details, reference is made to DE 10 2012 101 262 B3, the content of which is incorporated in this patent application in full by reference. As explained in DE 10 2012 101 262 B3, the wavefront changing effect of the free-form plates deflected laterally with respect to one another parallel to the direction of the displacement of the free-form plates is proportional to the derivative of the profile function with respect to the coordinate of the displacement direction. A deflection of a free-form profile in accordance with the aforementioned equation 1 parallel to the y-direction therefore produces an adjustable rotationally symmetric parabolic component of the wavefront, that is to say a continuously adjustable refractive power, with which the corresponding vision defect of an eye (which is accompanied by a refractive power that is too small (hyperopic) or too large (myopic) in comparison with the length of the eyeball) can be compensated. A deflection of the same free-form profile parallel to the x-direction, by contrast, produces an astigmatic wavefront component, the axis of which (i.e., the azimuthal orientation about the optical axis or viewing direction) is adjusted by a joint rotation of the free-form plates about the same axis. In this way, any desired spherocylindrical refractive power compensation can be set using only two free-form plates with facing free-form profiles as per aforementioned equation 1, and hence it is possible to optimally compensate a corresponding vision defect of the eye. In principle, it is also possible to compensate higher order vision defects with appropriate profiles with higher order polynomials, as explained in particular in DE 10 2012 101 262 B3 and in the publication by I. A. Palusinski et al., "Lateral-shift variable aberration generators" in Applied Optics, volume 38 (1999), pages 86 to 90.

In an exemplary embodiment of the optical system according to an aspect of the disclosure, provision is additionally or alternatively made for an aperture unit to be arranged at the intermediate pupil, the aperture unit trimming beams emanating from the display unit. Since the optical system according to an aspect of the disclosure basically provides a conjugate equipment pupil, this allows the observer to directly and intuitively perceive when their eye position leaves the admissible region of the eye box. Further, the observer is provided with feedback regarding the direction in which and distance that they should move their eye laterally relative to a reference axis, for example the optical axis of the optical system according to an aspect of the disclosure, in order to be sufficiently centered again with respect to the reference axis of the optical system according to an aspect of the disclosure. In this respect, this exemplary embodiment of the optical system according to an aspect of the disclosure solves the problem of specifying an optical system including a display unit which has a boundary of the eye box that guides the eye of an observer. Expressed differently, the intention is to specify an optical system including a display unit, in which the observer directly and intuitively perceives when their eye position leaves the admissible region of the eye box and in which said observer is moreover provided with feedback regarding the direction in which and distance that they should move their eye laterally relative to the reference axis of the optical system in order to be sufficiently centered again with respect to the reference axis of the optical system.

In a further exemplary embodiment of the optical system according to an aspect of the disclosure, provision is additionally or alternatively made for the aperture unit to be embodied as a mechanical aperture unit.

In an even further exemplary embodiment of the optical system according to an aspect of the disclosure, provision is additionally or alternatively made for the aperture unit to be provided with a circular aperture, with a size of the aperture being fixedly predetermined or adjustable. In addition or as an alternative thereto, provision is made for the aperture unit to be provided with an elliptical aperture, with a size of the aperture being fixedly predetermined or adjustable. An elliptical aperture is advantageous for the provision of an eye box which has a different extent vertically (i.e., with regards to height) and horizontally (i.e., with regards to width). In the case of equipment for binocular observation in particular (e.g., a pair of field glasses or a microscope with a binocular eyepiece), an eye box with a horizontal (lateral) extent that is larger than the vertical extent of the eye box is often advantageous since, in addition to the unavoidable head movement of the observer, additional play is desirable for taking account of the interpupillary distances, which are different for different people, between a right eye and a left eye.

Explicit reference is made to the fact that the disclosure is not restricted to the aforementioned aperture shapes. Instead, the aperture may have any shape that is suitable for the disclosure and/or required for a desired shape of the eye box.

In yet a further exemplary embodiment of the optical system according to an aspect of the disclosure, provision is additionally or alternatively made for the first lens group to have an intermediate caustic. In this context, both above and below, an intermediate caustic refers to an intermediate image in which the light rays emanating from a field point intersect at different axial positions in the two principal sections, with the result that no perceivable intermediate image is present in the conventional sense. The intermediate caustic may be a plane and corrected intermediate image. However, the intermediate caustic need not be in the form of the above-described intermediate image. The intermediate caustic can facilitate the configuration of eyepieces with a large eye box and, at the same time, a short focal length.

In an exemplary embodiment of the optical system according to an aspect of the disclosure, provision is additionally or alternatively made for a first beam to run from a first location on the display unit in the light incidence direction, for a second beam to run from a second location on the display unit in the light incidence direction, and for at least 70% or at least 80% or at least 90% of the first beam and the second beam to overlap at the intermediate pupil. Expressed differently, this exemplary embodiment of the optical system according to an aspect of the disclosure provides for the first beam to run from the first location on the display unit in the light incidence direction, for the second beam to run from the second location on the display unit in the light incidence direction, and for the second lens group to be designed such that at least 70% or at least 80% or at least 90% of the first beam and the second beam overlap at the intermediate pupil. The aforementioned exemplary embodiment ensures that the intermediate pupil is imaged by the first lens group in the eye box without significant imaging aberrations, with the result that a one-to-one correspondence between the positions in the eye box and the corresponding positions in the conjugate intermediate pupil is maintained. All beams emanating from the various regions of the display unit are uniformly vignetted by the stop arranged in the plane of the intermediate pupil. This ensures that the observer, when their eye pupil is laterally offset, perceives a reduction in the image brightness that occurs uniformly over the entire region of the display unit before, ultimately, there is complete trimming of the image.

In a further exemplary embodiment of the optical system according to an aspect of the disclosure, provision is additionally or alternatively made for the optical system according to an aspect of the disclosure to be provided with at least one eye tracking device. The eye tracking device is used to determine the position of the eye pupil of the observer in the spatial region (i.e., the eye box) and to determine the viewing direction of the observer. If the position of the eye pupil in the spatial region and the viewing direction of the observer are known, it is possible to at least partially correct field angle-dependent, that is to say viewing angle-dependent, aberrations of the optical system according to an aspect of the disclosure with a wavefront manipulator arranged at the intermediate pupil. A uniformly good correction of a large image field, for example in the case of a digital eyepiece or a virtual reality device, is known to be difficult since complex optical systems with a large number of optical units have been used to date. In the optical system according to an aspect of the disclosure, there now is a deflection of the optical units of the wavefront manipulator on the basis of the determined position of the eye pupil and of the determined viewing direction of the observer, with the deflection depending on the region to be observed (i.e., a "region of interest") in the visual field. This enables an at least partial compensation of the aberrations occurring in the region to be observed.

The disclosure also relates to an optical device including an optical system having at least one of the features specified further above or further below or a combination of at least two of the features specified further above or further below. The optical device is embodied as a pair of field glasses, as a refractor, as a telescope, as a light microscope, as night vision equipment, as digital-optical equipment for use in surgery, as augmented reality equipment, as virtual reality equipment, and/or as a digital microscope, in particular as a digital surgical microscope. The above enumeration should not be construed as exhaustive. Rather, any optical device usable with the optical system according to the aspects of disclosure can be used as an optical device.

BRIEF DESCRIPTION OF THE DRAWINGS

The disclosure will now be described with reference to the drawings wherein:

FIG. 3 shows system data of the optical system according to FIG. 2;

FIG. 4 shows a sphere coefficients for surfaces of the optical system according to FIG. 2;

DESCRIPTION OF EXEMPLARY EMBODIMENTS

The optical system according to an exemplary embodiment of the disclosure is now explained in more detail on the basis of an optical device in the form of a digital microscope, in particular a digital surgical microscope. Explicit reference is made to the fact that the disclosure is not restricted to the use in a digital microscope. Instead, the disclosure can be used for any optical equipment for which the disclosure is suitable. By way of example, the optical system according to an exemplary embodiment of the disclosure is arranged in an optical device in the form of a pair of field glasses, a refractor, a telescope, a spotting scope, a light microscope, digital-optical equipment for use in surgery, an augmented reality device, a virtual reality device, and/or night vision equipment.

Figure 1:
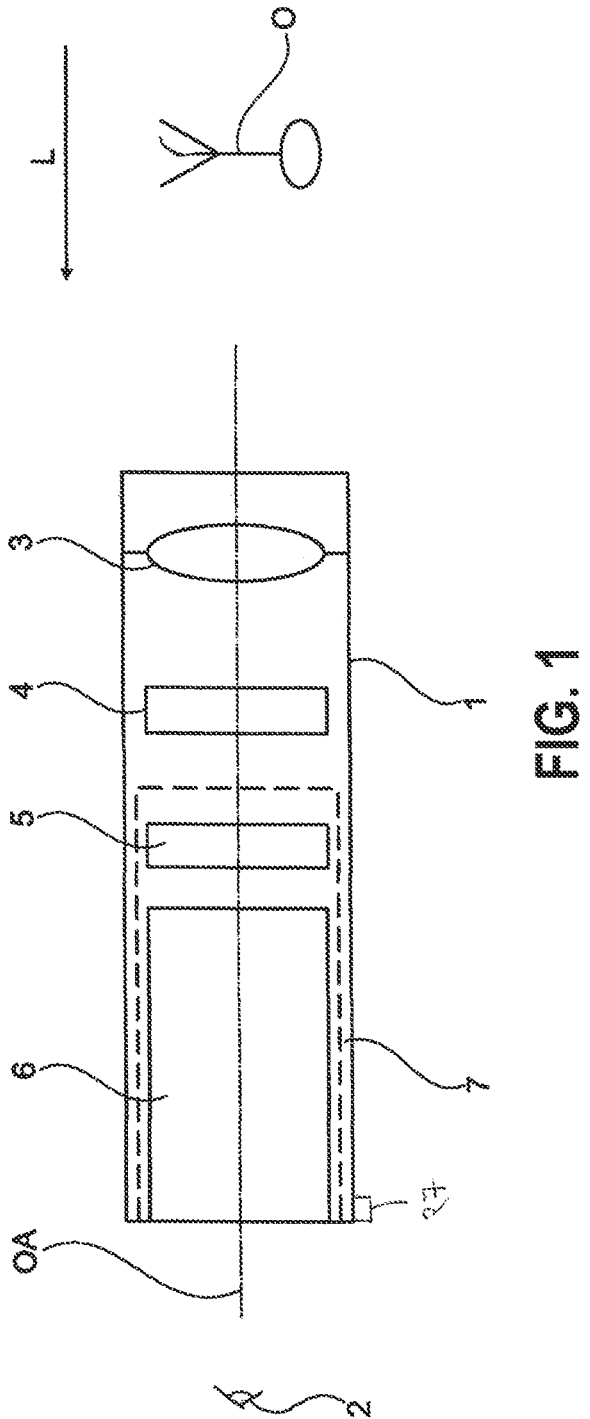
FIG. 1 shows a schematic representation of a digital microscope, in particular a digital surgical microscope, including an optical system according to an exemplary embodiment of the disclosure.

FIG. 1 shows a schematic representation of a digital microscope 1, with which a user of the digital microscope 1 can observe an object O by placing an eye 2 against the digital microscope 1. The digital microscope 1 includes an objective 3 and a detector 4. The detector 4 detects light rays which pass from the object O through the objective 3 and generates detection signals. These detection signals are electronically converted such that they are presented as an image on a display unit 5. Further, the night vision equipment 1 includes an eyepiece 6, with which the user of the digital microscope 1 can observe the image presented on the display unit 5.

By way of example, the detector 4 can be in the form of a charge-coupled device (CCD) detector or complementary metal-oxide semiconductor (CMOS) detector. However, the disclosure is not restricted to the aforementioned exemplary embodiments. Rather, the detector 4 can be any detector suitable for the disclosure.

By way of example, a field emission visual display unit, a liquid crystal visual display unit, a thin film transistor visual display unit, a plasma visual display unit, an SED, or a visual display unit containing organic light-emitting diodes can be used as a display unit 5. The above enumeration is not exhaustive. Rather, any display unit suitable for the disclosure can be used as display unit 5.

As shown in FIG. 1, the light rays originating from the object O enter the digital microscope 1 in a light incidence direction L. Therefore, the light rays initially pass through the objective 3 and are subsequently detected by the detector 4.

By way of example, the arrangement of the abovementioned units of the digital microscope 1 along an optical axis OA of the digital microscope 1 can be described as follows: As seen in a direction opposite to the light incidence direction L, that is to say as seen from the eye 2 in the direction of the object O, the eyepiece 6 is arranged first along the optical axis OA of the digital microscope 1, followed by the display unit 5, then the detector 4, and then the objective 3.

An optical system according to an exemplary embodiment of the disclosure is depicted using dashed lines in FIG. 1 and is provided with reference sign 7. The optical system 7 according to the exemplary embodiment of the disclosure includes the eyepiece 6 and the display unit 5.

Figure 2:
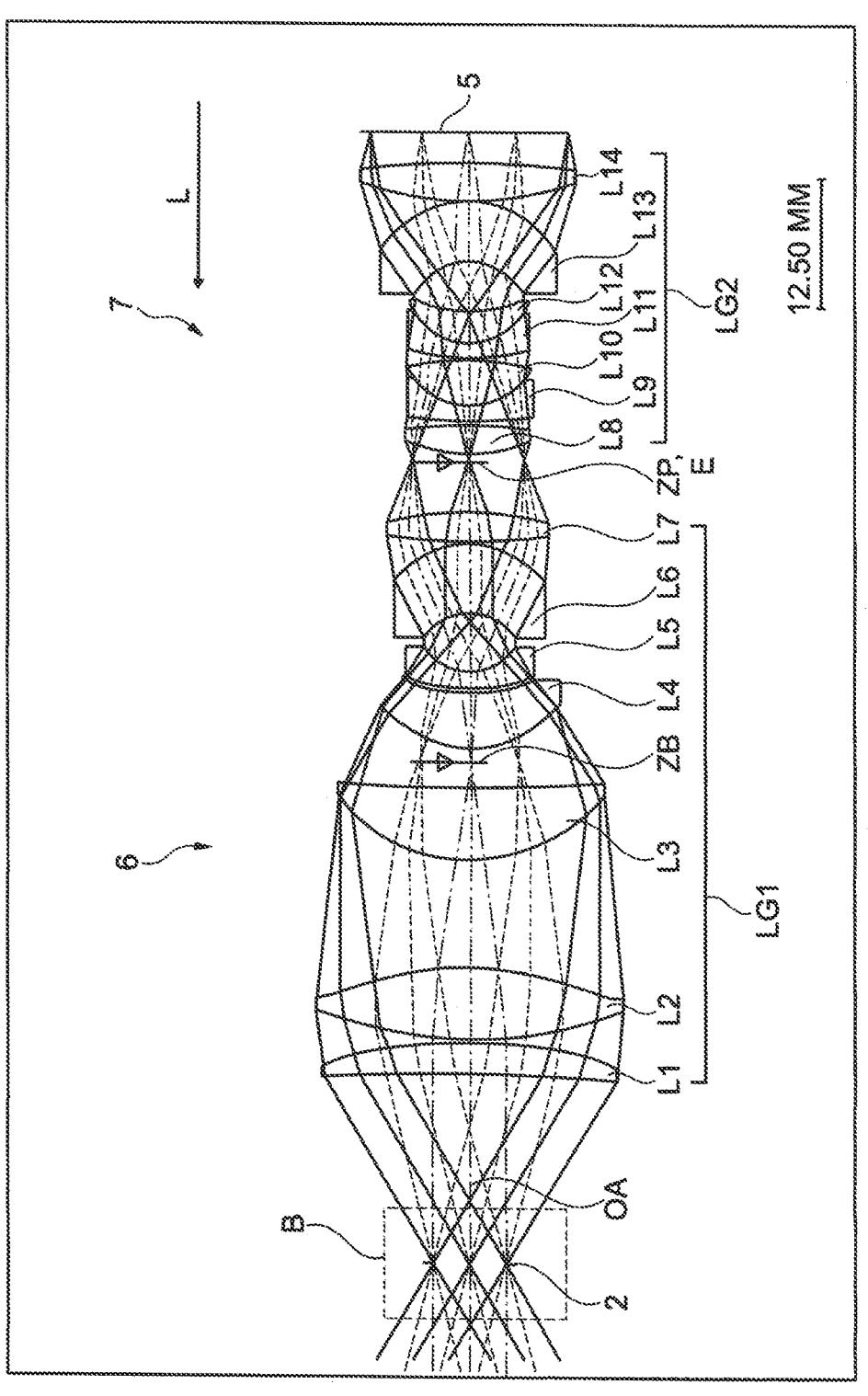
FIG. 2 shows a schematic representation of an optical system according to an exemplary embodiment of the disclosure.

FIG. 2 shows an optical system 7 according to an exemplary embodiment of the disclosure, which has an optical axis OA that corresponds to the optical axis OA of the digital microscope 1. As already explained above, this exemplary embodiment of the optical system 7 is also arranged in an optical device in the form of a pair of field glasses, a refractor, a telescope, a spotting scope, a light microscope, digital-optical equipment for use in surgery, an augmented reality device, a virtual reality device, and/or night vision equipment. An eyepiece 6 includes a first lens group LG1 and a second lens group LG2. As seen in a direction opposite to the light incidence direction L, the first lens group LG1 is arranged first along the optical axis OA, followed by the second lens group LG2. An intermediate pupil ZP is arranged between the first lens group LG1 and the second lens group LG2.

The first lens group LG1 of the optical system 7 according to the exemplary embodiment the disclosure in accordance with FIG. 2 includes a first lens L1, a second lens L2, a third lens L3, a fourth lens L4, a fifth lens L5, a sixth lens L6, and a seventh lens L7. As seen in a direction opposite to the light incidence direction L, the first lens L1 is arranged first along the optical axis OA, followed by the second lens L2, then the third lens L3, then the fourth lens L4, then the fifth lens L5, then the sixth lens L6, and then the seventh lens L7.

The second lens group LG2 of the optical system 7 according to the exemplary embodiment of the disclosure in accordance with FIG. 2 includes an eighth lens L8, a ninth lens L9, a tenth lens L10, an eleventh lens L11, a twelfth lens L12, a thirteenth lens L13, and a fourteenth lens L14. As seen in a direction opposite to the light incidence direction L, the eighth lens L8 is arranged first along the optical axis OA, followed by the ninth lens L9, then the tenth lens L10, then the eleventh lens L11, then the twelfth lens L12, then the thirteenth lens L13, and then the fourteenth lens L14.

The first lens group LG1 may also be referred to as a pupil relay unit. A lens group is understood to mean a group containing at least one optical assembly, for example in the form of a lens. In particular, provision is made for the lens group to include only a single lens or a plurality of lenses.

No further optical unit of the optical system 7 is arranged between the first lens L1 and an eye pupil of the eye 2. The distance between the eye pupil and the first lens L1 is approx. 18.4 mm. Here, this value has been chosen such that a particularly typical distance of approx. 18 mm also arises at the edge of the slightly concavely shaped front side of the first lens L1.

In this exemplary embodiment of the optical system 7, the display unit 5 is configured such that, for a display with a visual field with a diameter of 19.2 mm, a large apparent visual field diameter of 60° arises when the visual field is completely filled at the display unit 5. By way of example, the display unit 5 includes a 1 inch display with a resolution of 2096×2096 pixels, into which it is possible to write a circular field of vision with a diameter of 18.4 mm. Then, the apparent visual field diameter is slightly less than 60%. The image circle is imaged by the eyepiece 6 into the circular apparent field of vision of the observer with 60° diameter, possibly taking account of a pincushion distortion (i.e., a negative—that is to say barrel—distortion from the eye to the display unit 5) of −5.3%. This satisfies the Merlitz condition. Reference is made to the explanations further below.

The paraxial focal length of the eyepiece 6 in this exemplary embodiment of the optical system 7 is 17.55 mm. Further, a pre-definable spatial region B is arranged at the eyepiece 6, in which spatial region the eye 2 can move in such a way without a pre-definable threshold value of an image quality of an image representation of the image produced by the eyepiece 6 being undershot. The pre-determinable region B is the eye box, which has already been defined further above. As seen in the direction of the spatial region B starting from the display unit 5, the display unit 5 is arranged first in the light incidence direction L, followed by the eyepiece 6 and then the spatial region B.

As already explained above, the intermediate pupil ZP is arranged between the first lens group LG1 and the second lens group LG2. The second lens group LG2 is designed to image the image displayed by the display unit 5 into the intermediate pupil ZP. Moreover, the first lens group LG1 is configured to image the image arranged in the intermediate pupil ZP into the spatial region B. The intermediate pupil ZP and the spatial region B are conjugate to one another.

A unit E is arranged at the intermediate pupil ZP. Expressed differently, the unit E is arranged at the location of the intermediate pupil ZP. Expressed yet again differently, the unit E is arranged in a plane at the location of the intermediate pupil ZP. Exemplary embodiments of the unit E will be explained further below.

The first lens group LG1 has an intermediate caustic ZB, which is arranged between the third lens L3 and the fourth lens L4 of the optical system 7 according to this exemplary embodiment of the disclosure. The intermediate caustic ZB may be a plane and corrected intermediate image. However, the intermediate caustic ZB need not be in the form of the above-described intermediate image. The intermediate caustic can facilitate the design of an eyepiece 6 with a large eye box and, at the same time, a short focal length.

The exemplary embodiment of the optical system 7 according to FIG. 2 is configured for a maximum eye box with a 7 mm diameter. This means that the observer with an assumed eye pupil with a 3 mm diameter (the assumption being that of an eye adapted to moderate brightness) can move an eye position arranged on the optical axis OA by up to 2 mm to each side before any vignetting occurs.

The system data of the optical system 7 according to the exemplary embodiment of the disclosure in accordance with FIG. 2 emerge from the table in FIG. 3. The surface 0 denotes a surface at an infinite distance in front of the optical system 7 on the side of the eye 2. Further, the surface 1 denotes the surface of the eye pupil of the eye 2. Light emerges from the optical system 7 in collimated fashion and enters the eye pupil (surface 1). The first lens L1 has a surface 2 facing the eye 2 and a surface 3 facing the display unit 5. The second lens L2 has a surface 4 facing the eye 2 and a surface 5 facing the display unit 5. The third lens L3 has a surface 6 facing the eye 2 and a surface 7 facing the display unit 5. The intermediate caustic ZB is denoted by the surface 8. The fourth lens L4 has a surface 9 facing the eye 2 and a surface 10 facing the display unit 5. The fifth lens L5 has a surface 11 facing the eye 2 and a surface 12 facing the display unit 5. Further, the sixth lens L6 has a surface 13 facing the eye 2 and a surface 14 facing the display unit 5. The seventh lens L7 has a surface 15 facing the eye 2 and a surface 16 facing the display unit 5. The intermediate pupil is denoted by the surface 17. The eighth lens L8 has a surface 18 facing the eye 2 and a surface 19 facing the display unit 5. The ninth lens L9 has a surface 20 facing the eye 2. The tenth lens L10 has a surface 21 facing the eye 2 and a surface 22 facing the display unit 5. The eleventh lens L11 has a surface 23 facing the eye 2. Further, the twelfth lens L12 has a surface 24 facing the eye 2 and a surface 25 facing the display unit 5. The thirteenth lens L13 has a surface 26 facing the eye 2 and a surface 27 facing the display unit 5. Further, the fourteenth lens L14 has a surface 28 facing the eye 2 and a surface 29 facing the display unit 5. The surface 30 denotes the surface of the display unit 5.

Further, the table in FIG. 3 specifies the radii of the individual surfaces and the thicknesses of the individual lenses of the optical system 7 according to the exemplary embodiment of the disclosure in accordance with FIG. 2, with the thickness of a lens being defined as the distance between a first vertex at the optical axis OA of a surface of the lens facing the eye 2 and a second vertex at the optical axis OA of a surface of the lens facing the display unit 5. A thickness between two of the aforementioned lenses denotes the distance between two vertices of two adjacent surfaces with two lenses.

The table in FIG. 3 specifies the material of the individual lenses, the material specification corresponding to the nomenclature as used by the company OHARA. However, the fifth lens L5 and the sixth lens L6 are formed from a material from the company Schott. Further, the half diameter of the individual lenses is specified in the table in FIG. 3. Some surfaces have an aspherical form. The aspherical form of the aforementioned surfaces is determined by the asphere formula, which is given by $$z(h) = \frac{h^2}{R \cdot \left(1 + \sqrt{1 - (1+k) \cdot \frac{h^2}{R^2}}\right)} + \sum_{i=2}^{M} C_{i-1} h^{2i} \qquad [1]$$

where
(i) z is the surface sagitta value,
(ii) h is the height of incidence of a light ray on the aspherical surface of the lens,
(iii) k is the conic constant,
(iv) R is the vertex radius of the surface, and
(v) $C_i$ are asphere coefficients.

The asphere coefficients and the conic constant are specified in the table in FIG. 4.

Figure 5:
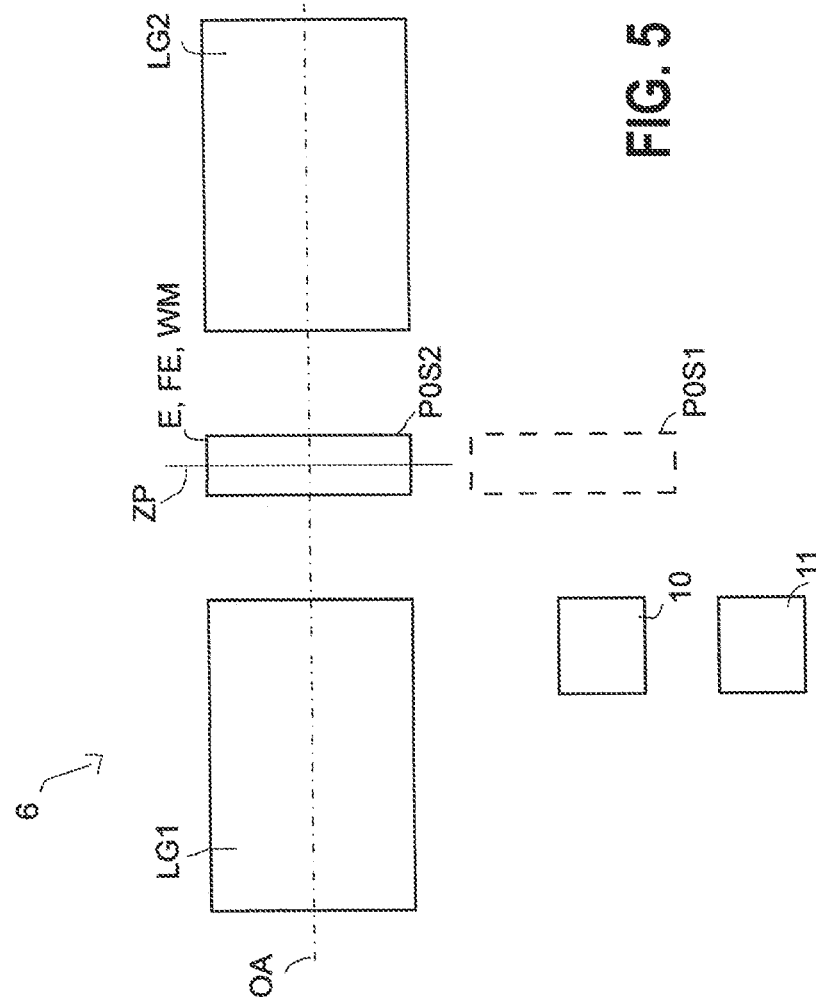
FIG. 5 shows a schematic representation of an eyepiece of the optical system according to an exemplary embodiment of the disclosure.

FIG. 5 shows a schematic representation of the eyepiece 6 of the optical system 7 according to an exemplary embodiment of the disclosure. Depicted are the optical axis OA, the first lens group LG1, the second lens group LG2, the intermediate pupil ZP arranged between the first lens group LG1 and the second lens group LG2, and the unit E, which is arranged at the intermediate pupil ZP.

The optical system 7 according to an exemplary embodiment of the disclosure includes a drive unit 10 for moving the unit E. The drive unit 10 is operatively arranged at the unit E. The unit E is embodied to be movable such that the unit E can be moved from a first position POS1 outside of the intermediate pupil ZP, which is depicted using dashed lines in FIG. 5, to a second position POS2 at the intermediate pupil ZP. Expressed differently, the unit E can be moved from the first position POS1 to the second position POS2. In addition or as an alternative thereto, provision is made for the unit E to be able to be moved from the second position POS2 to the first position POS1. The drive unit 10 is embodied as a mechanical and/or electrical drive unit, for example. In particular, provision is made for the unit E to be pivoted from the first position POS1 into the second position POS2 at the intermediate pupil ZP or be pivoted out of the intermediate pupil ZP from the second position POS2 into the first position POS1.

The unit E is embodied as a filter unit FE and/or as a wavefront manipulator WM, for example. Expressed differently, the filter unit FE and/or the wavefront manipulator WM is/are arranged in a plane at the location of the intermediate pupil ZP.

The filter unit FE is embodied to be movable such that the filter unit FE can be moved from the first position POS1 (specifically a first filter unit position) outside of the intermediate pupil ZP to the second position POS2 (specifically a second filter unit position) at the intermediate pupil ZP. Expressed differently, the filter unit FE can be moved from the first filter unit position to the second filter unit position. In addition or as an alternative thereto, provision is made for the filter unit FE to be able to be moved from the second filter unit position to the first filter unit position. In particular, provision is made for the filter unit FE to be pivoted from the first filter unit position into the second filter unit position at the intermediate pupil ZP or be pivoted out of the intermediate pupil ZP from the second filter unit position into the first filter unit position.

The wavefront manipulator WM is embodied to be movable such that the wavefront manipulator WM can be moved from the first position POS1 (a first wavefront manipulator position) outside of the intermediate pupil ZP to the second position POS2 (a second wavefront manipulator position) at the intermediate pupil ZP. Expressed differently, the wavefront manipulator WM can be moved from the first wavefront manipulator position to the second wavefront manipulator position. In addition or as an alternative thereto, provision is made for the wavefront manipulator WM to be able to be moved from the second wavefront manipulator position to the first wavefront manipulator position. In particular, provision is made for the wavefront manipulator WM to be pivoted from the first wavefront manipulator position into the second wavefront manipulator position at the intermediate pupil ZP or be pivoted out of the intermediate pupil ZP from the second wavefront manipulator position into the first wavefront manipulator position.

In a further exemplary embodiment of the optical system 7 according to an aspect of the disclosure, the drive unit 10 is embodied as a first drive unit. Additionally, a second drive unit 11 is arranged at the optical system 7 according to an exemplary embodiment of the disclosure. Then, the first drive unit 10 is embodied to move the filter unit FE. By contrast, the second drive unit 11 is embodied to move the wavefront manipulator WM.

The filter unit FE is embodied as an anti-aliasing filter, for example. In particular, the anti-aliasing filter includes a birefringent plate or birefringent layers. The birefringence of the birefringent plate or of the birefringent layers can be chosen such that a modulation transfer function of the optical system 7 according to an exemplary embodiment of the disclosure is damped in targeted fashion beyond the Nyquist frequency or beyond a fraction of the Nyquist frequency. Optical assemblies having birefringent layers or birefringent plates made of quartz or lithium niobate are already known from the prior art. The aforementioned filter units FE are particularly well suited to reduce disturbing effects in the form of aliasing effects and, on account of a perceivability, moiré-type effects.

The filter unit FE is alternatively embodied as an apodization filter. As mentioned above, an apodization filter is a graduated filter with a radially varying transmission, the curve of which follows a Gaussian function, for example. By way of example, the light intensity in higher orders of diffraction of a point spread function are suppressed with the apodization filter. In the optical system 7 according to an exemplary embodiment of the disclosure, this has a positive effect on the perception of the image quality, with the result that an image appears soft and natural.

Alternatively, the filter unit FE is embodied as an optical spatial frequency filter. Using an optical spatial frequency filter, it is possible to obtain a desired image effect, for example the highlighting or suppression of specific structures in the image perceived by the observer. The structures correspond to certain Fourier components (spatial frequency components) in the pupil plane.

By way of example the wavefront manipulator WM is embodied as a static wavefront manipulator WM. As already explained above, a static wavefront manipulator WM is understood to mean a wavefront manipulator which corrects vision defects (vision disorders) of a specific observer. Expressed differently, the static wavefront manipulator WM is provided only for a single observer.

Figure 6:
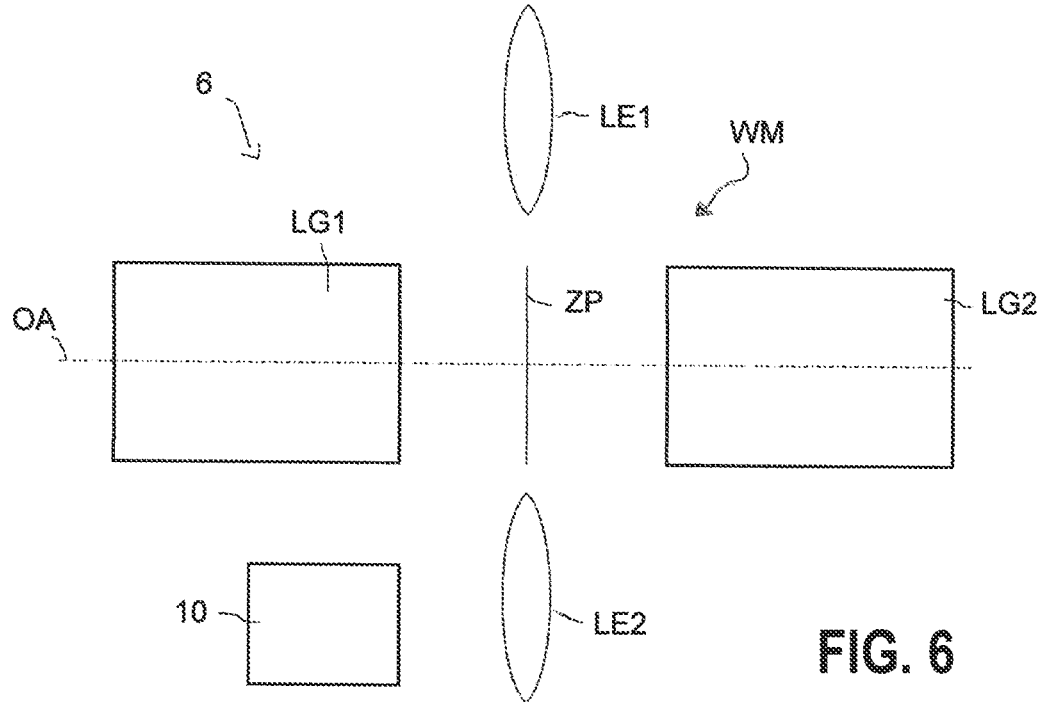
FIG. 6 shows a further schematic representation of an eyepiece of the optical system according to an exemplary embodiment of the disclosure.

FIG. 6 shows a further schematic representation of the eyepiece 6 of the optical system 7 according to an exemplary embodiment of the disclosure. FIG. 6 is based on FIG. 5. Identical components are provided with identical reference signs. The optical axis OA, the first lens group LG1, the second lens group LG2, the drive unit 10, and the intermediate pupil ZP arranged between the first lens group LG1 and the second lens group LG2 are depicted. Further, FIG. 6 shows a static wavefront manipulator WM in the form of a first lens unit LE1, which can be moved to the location of the intermediate pupil ZP with the drive unit 10. The first lens unit LE1 is embodied such that it corrects vision defects of a specific observer. In a further exemplary embodiment, a second lens unit LE2 is arranged in the eyepiece 6 in addition to the first lens unit LE1. The lens unit LE1 and/or the lens unit LE2 can be moved to the location of the intermediate pupil ZP with the drive unit 10. By way of example, the drive unit 10 is in the form of a wheel on which the first lens unit LE1 and the second lens unit LE2 are arranged at different positions. By rotating the wheel, one of the aforementioned lens units LE1, LE2 is arranged at the location of the intermediate pupil ZP in each case. The first lens unit LE1 has a first spherical power and/or a first cylindrical power. By contrast, the second lens unit LE2 has a second spherical power and/or a second cylindrical power. Further, at least one of the following features holds true: (a) the first spherical power is different from the second spherical power; and (b) the first cylindrical power is different from the second cylindrical power.

In a further exemplary embodiment of the static wavefront manipulator WM, the wavefront manipulator WM includes at least one phase plate. The phase plate is likewise embodied such that it corrects the vision defects of a specific observer.

As explained above in respect of FIG. 5, the unit E can be in the form of a wavefront manipulator WM. By way of example, the wavefront manipulator WM is embodied as an adjustable wavefront manipulator WM. As explained above, an adjustable wavefront manipulator WM is understood to mean a wavefront manipulator whose manipulation properties in relation to a wavefront are adjustable, for example by adjusting the refractive power of the wavefront manipulator WM and/or by moving the wavefront manipulator WM.

With the adjustable wavefront manipulator WM, it is possible, firstly, to correct, in the intermediate pupil ZP, individual vision defects (vision disorders) of an observer and, secondly, to use the optical system according to an exemplary embodiment of disclosure for a plurality of observers, with the vision defects (vision disorders) of the observer currently using the optical system according to an exemplary embodiment of the disclosure being correctable with the adjustable wavefront manipulator WM.

In particular, provision is made for the adjustable wavefront manipulator WM to include at least one liquid lens unit or to be formed by a liquid lens unit. The refractive power of the liquid lens unit is variably adjustable. As already explained above, a liquid lens unit is understood to be a unit which includes at least one liquid lens. In addition or as an alternative thereto, provision is made for the adjustable wavefront manipulator WM to include at least one elastopolymer lens unit. The refractive power of the elastopolymer lens unit is variably adjustable. As likewise explained above, an elastopolymer lens unit is understood to be a unit which includes at least one elastopolymer lens.

Figure 7:
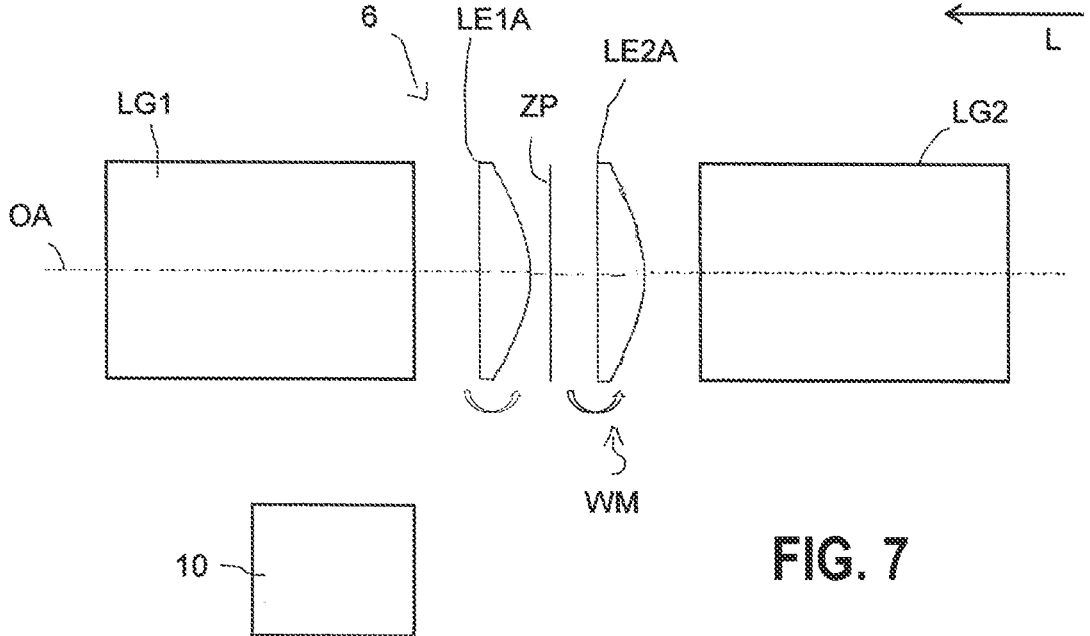
FIG. 7 shows an even further schematic representation of an eyepiece of the optical system according to an exemplary embodiment of the disclosure.

FIG. 7 shows a further schematic representation of the eyepiece 6 of the optical system 7 according to an exemplary embodiment of the disclosure. FIG. 7 is based on FIG. 5. Identical components are provided with identical reference signs. The optical axis OA, the first lens group LG1, the second lens group LG2, the drive unit 10, and the intermediate pupil ZP arranged between the first lens group LG1 and the second lens group LG2 are depicted. Further, FIG. 7 shows an adjustable wavefront manipulator WM arranged at the intermediate pupil ZP and including a first lens unit LE1A and a second lens unit LE2A. As seen in a direction opposite to the light incidence direction L, the first lens unit LE1A is arranged first on the optical axis OA, followed by the second lens unit LE2A. The first lens unit LE1A is embodied as a first cylindrical lens unit. By contrast, the second lens unit LE2A is embodied as a second cylindrical lens unit. Further, the first lens unit LE1A and the second lens unit LE2A are embodied to be rotatable relative to one another. By changing the angle of rotation of the first lens unit LE1A relative to the second lens unit LE2A, it is possible to influence the strength and axis of an astigmatic wavefront and consequently to compensate, that is to say correct, the astigmatism of an observer.

Figure 8:
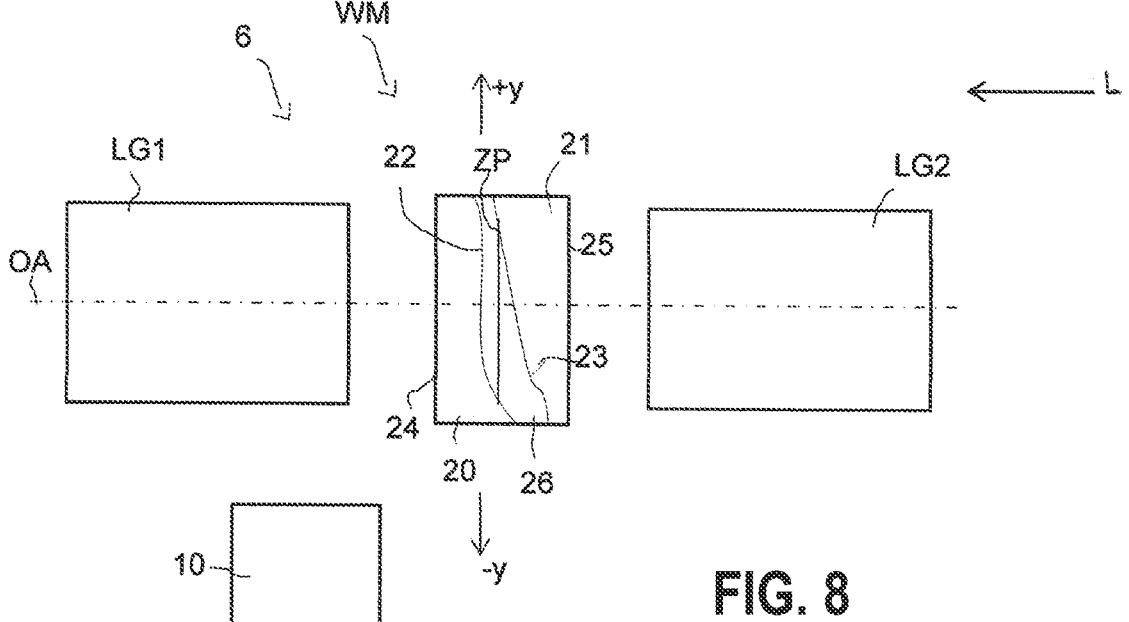
FIG. 8 shows yet a further schematic representation of an eyepiece of the optical system according to an exemplary embodiment of the disclosure.

FIG. 8 shows a further schematic representation of the eyepiece 6 of the optical system 7 according to an exemplary embodiment of the disclosure. FIG. 8 is based on FIG. 5. Identical components are provided with identical reference signs. The optical axis OA, the first lens group LG1, the second lens group LG2, the drive unit 10, and the intermediate pupil ZP arranged between the first lens group LG1 and the second lens group LG2 are depicted. Further, FIG. 8 shows an adjustable wavefront manipulator WM in the form of an Alvarez element arranged at the intermediate pupil ZP. The adjustable wavefront manipulator WM includes a first optical unit 20 and a second optical unit 21. In a direction opposite to the light incidence direction L, the first optical unit 20 is arranged first on the optical axis OA, followed by the second optical unit 21. The first optical unit 20 and the second optical unit 21 are each arranged so as to be able to be moved relative to one another in a movement direction perpendicular to the optical axis OA. To move the first optical unit 20 and/or the second optical unit 21, the drive unit 10 is operatively arranged at the first optical unit 20 and/or the second optical unit 21. The first optical unit 20 includes a refractive first free-form surface 22 and a first plane surface 24, which is arranged on a side of the first optical unit 20 distant from the first free-form surface 22. The second optical unit 21 includes a refractive second free-form surface 23 and a second plane surface 25, which is arranged on a side of the second optical unit 21 distant from the second free-form surface 23. The first optical unit 20 and the second optical unit 21 are arranged relative to one another such that the first free-form surface 22 and the second free-form surface 23 are arranged opposite one another. In a zero position of the adjustable wavefront manipulator WM, the first free-form surface 22 and the second free-form surface 23 are arranged in a manner complementary to one another. Consequently, the first optical unit 20 and the second optical unit 21 form a plane-parallel plate in the zero position. The first optical unit 20 and the second optical unit 21 are displaceable transversely to the optical axis OA. By way of example, the first optical unit 20 is displaceable in the +y-direction (cf. FIG. 8). Further, the second optical unit 21 is displaceable in the −y-direction (cf. FIG. 8), for example. In particular, the displacements are by the same absolute values implemented in opposite directions to one another.

In a further exemplary embodiment of the wavefront manipulator WM, the first optical unit 20 and the second optical unit 21 each include a first optical element and at least a further optical element with deviating refractive index progressions $n_1(\lambda)$ and $n_1(\lambda)$, the optical elements being arranged successively along the reference axis in the form of the optical axis OA. In relation to local coordinates x and y of the respective optical unit 20, 21, the optical elements have a location-dependent length in the z-direction parallel to the reference axis, where the index i denotes the optical element.

In an even further exemplary embodiment of the wavefront manipulator WM, the first optical unit 20 and the second optical unit 21 each include a first optical element having at least one free-form surface, a refractive index $n_1$, and an Abbe number $v_1$ and a second optical element having at least one free-form surface, a refractive index $n_2$, and an Abbe number $v_2$, which optical units are arranged successively along the reference axis in the form of the optical axis OA. The Abbe numbers $v_1$ and $v_2$ differ from one another ($v_1 \neq v_2$).

By way of example, an immersion medium 26 is arranged between the first optical unit 20 and the second optical unit 21. The immersion medium 26 is in contact with both the first optical unit 20 and the second optical unit 21. By way of example, the immersion medium 26 is in the form of a liquid, in particular as high-purity water, as organic hydrocarbon, as a saline solution, or as an immersion oil. The above enumeration should not be construed as exhaustive. Instead, any immersion medium 26 that is suitable for the disclosure is usable for the disclosure. In a further exemplary embodiment, provision is made for the immersion medium 26 to be in the form of an elastic optical cement. The first optical unit 20 is arranged at the second optical unit 21 with the elastic optical cement.

The exemplary embodiment of the eyepiece 6 depicted in FIG. 8 is used in particular in an exemplary embodiment of the optical system 7 according to an aspect of the disclosure which includes an eye tracking device 27 (cf. FIG. 1 as well). The eye tracking device 27 is used to determine the position of the eye pupil in the spatial region B (i.e., the eye box) and to determine the viewing direction of the observer. If the position of the eye pupil in the spatial region B and the viewing direction of the observer are known, it is possible to at least partially correct field angle-dependent, that is to say viewing angle-dependent, aberrations of the optical system 7 according to an exemplary embodiment of the disclosure with the wavefront manipulator WM arranged at the intermediate pupil ZP. A uniformly good correction of a large image field, for example in the case of a digital eyepiece or a virtual reality device, is known to be difficult since complex optical systems with a large number of optical units have been used to date. In the optical system 7 according to an exemplary embodiment of the disclosure, there now is a deflection of the first optical unit 20 and the second optical unit 21 of the wavefront manipulator WM on the basis of the determined position of the eye pupil and of the determined viewing direction of the observer, with the deflection depending on the region to be observed (i.e., a "region of interest") in the visual field. This enables an at least partial compensation of the aberrations occurring in the region to be observed.

An exemplary embodiment of the optical system 7 according to an aspect of the disclosure was already explained further above in relation to FIG. 5. In a further exemplary embodiment of this optical system according to an aspect of the disclosure, provision is made, for example, for the unit E to be embodied as an aperture unit. This exemplary embodiment allows the observer to directly and intuitively perceive their eye position departing from the admissible region of the eye box. Further, the observer is provided with feedback regarding the direction in which and distance that they should move their eye laterally relative to the optical axis OA of the optical system 7 according to an exemplary embodiment of the disclosure, in order to be sufficiently centered again with respect to the optical axis OA of the optical system 7 according to an exemplary embodiment of the disclosure. By way of example, the aperture unit is embodied as a mechanical aperture unit. In particular, provision is made for the aperture unit to be provided with a circular aperture, with a size of the aperture being fixedly predetermined or adjustable. In addition or as an alternative thereto, provision is made for the aperture unit to be provided with an elliptical aperture, with a size of the aperture being fixedly predetermined or adjustable. An elliptical aperture is advantageous for the provision of an eye box which has a vertically and horizontally different extent. In the case of equipment for binocular observation in particular (e.g., a pair of field glasses or a microscope with a binocular eyepiece), an eye box with a horizontal (lateral) extent that is larger than the vertical extent of the eye box is often advantageous since, in addition to the unavoidable head movement of the observer, additional play is desirable for taking account of the interpupillary distances, which are different for different people, between a right eye and a left eye. Explicit reference is made to the fact that the disclosure is not restricted to the aforementioned aperture shapes. Instead, the aperture may have any shape that is suitable for the disclosure and/or required for a desired shape of the eye box.

The exemplary embodiment of the optical system 7 according to FIG. 2 is configured for a maximum eye box with a 7 mm diameter. This means that the observer with an assumed eye pupil with a 3 mm diameter (the assumption being that of an eye adapted to moderate brightness) can move an eye position arranged on the optical axis OA by up to 2 mm to each side before any vignetting occurs. To this end, the aperture unit has a circular aperture with a diameter of approx. 11 mm. A smaller aperture can also be used in further exemplary embodiments, in order to admit less vignetting for a laterally off-centered eye pupil.

In an even further exemplary embodiment of the optical system 7 according to an aspect of the disclosure, provision is made for a first beam to run from a first location on the display unit 5 in the light incidence direction L, for a second beam to run from a second location on the display unit 5 in the light incidence direction L, and for at least 70% or at least 80% or at least 90% of the first beam and the second beam to overlap at the intermediate pupil ZP. Expressed differently, this exemplary embodiment of the optical system 7 according to an aspect of the disclosure provides for the first beam to run from the first location on the display unit 5 in the light incidence direction L, for the second beam to run from the second location on the display unit 5 in the light incidence direction L, and for the second lens group LG2 to be configured such that at least 70% or at least 80% or at least 90% of the first beam and the second beam overlap at the intermediate pupil ZP. The aforementioned exemplary embodiment ensures that the intermediate pupil ZP is imaged by the first lens group LG1 into the spatial region B (the eye box) without significant imaging aberrations, with the result that a one-to-one correspondence between the positions in the eye box B and the corresponding positions in the conjugate intermediate pupil ZP is maintained. All beams emanating from the various regions of the display unit 5 are uniformly vignetted by the aperture unit E arranged in the plane of the intermediate pupil ZP. This ensures that the observer, when their eye pupil is laterally offset, perceives a reduction in the image brightness that occurs uniformly over the entire region of the display unit before, ultimately, there is complete trimming of the image.

Figure 9:
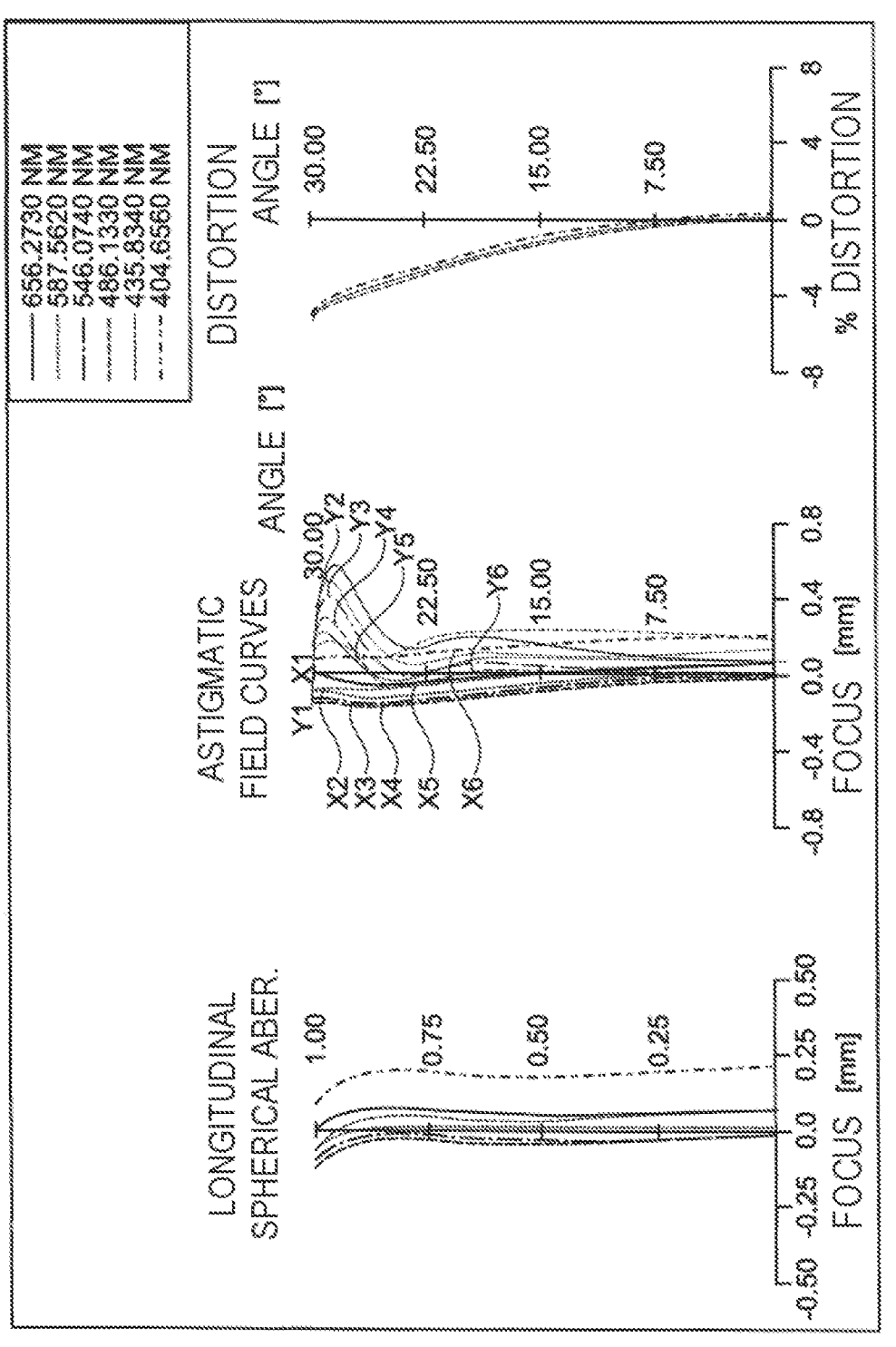
FIG. 9 shows a schematic representation of an aperture aberration, of image surface positions, and of the relative distortion for an optical system according to FIG. 2 with a maximum spatial region.
Figure 10:
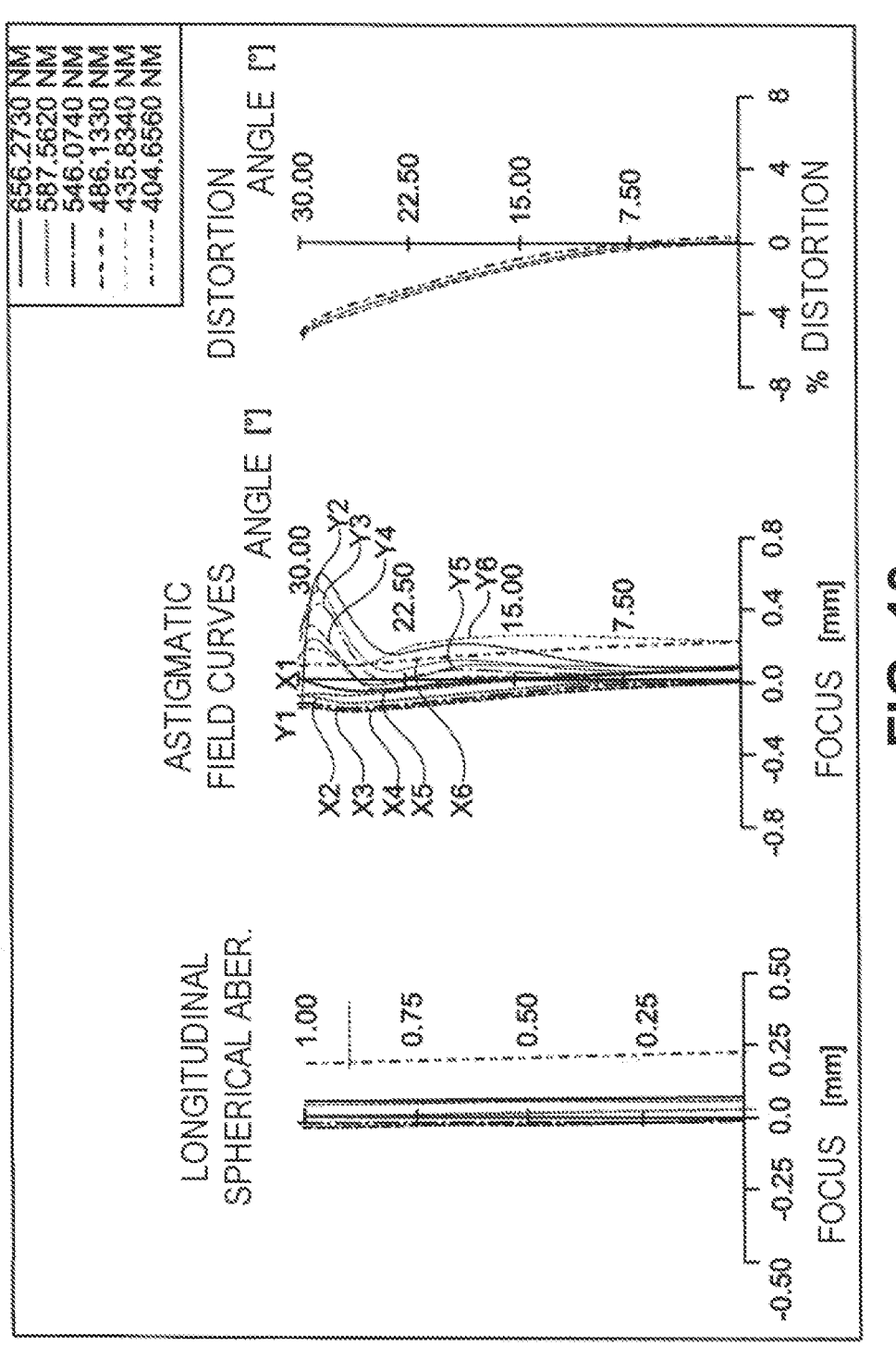
FIG. 10 shows a schematic representation of an aperture aberration, of image surface positions, and of the relative distortion for an optical system according to FIG. 2 with a centered eye pupil with a diameter of 3 mm.

For the optical system 7 according to an exemplary embodiment of the disclosure, which includes the unit E and is provided with a maximum eye box with a diameter of 7 mm, FIG. 9 shows a schematic representation of the aperture aberration (longitudinal spherical aberration), the tangential and sagittal image surface positions (astigmatic field curves), and the relative distortion. For the optical system 7 according to an exemplary embodiment of the disclosure with a centered eye pupil with a diameter of 3 mm, FIG. 10, by contrast, shows a schematic representation of the aperture aberration (longitudinal spherical aberration), the tangential and sagittal image surface positions (astigmatic field curves), and the relative distortion.

Figure 11:
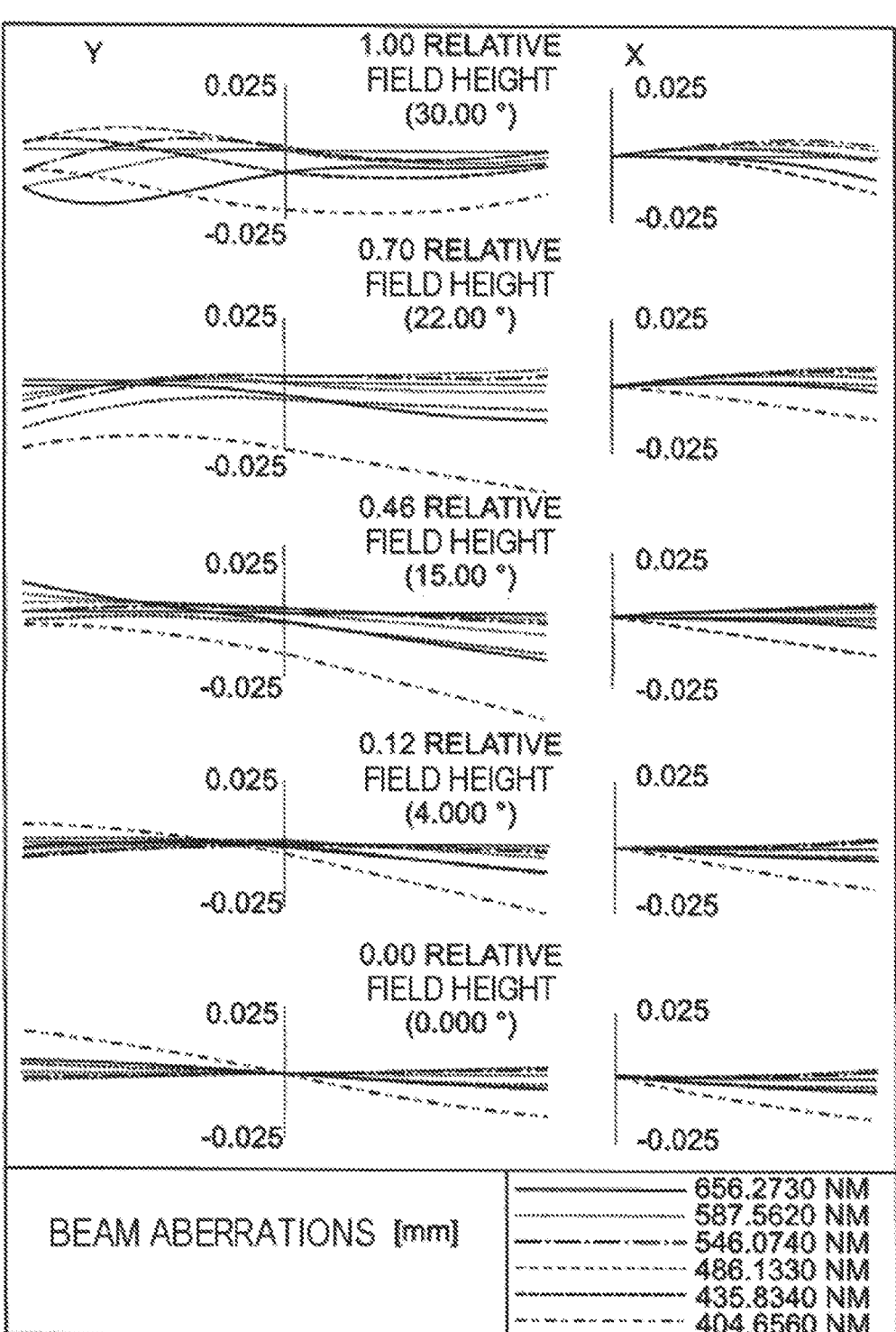
FIG. 11 shows a schematic representation of the transverse aberrations for a centered eye pupil with a diameter of 3 mm in the case of an optical system according to FIG. 2.
Figure 12:
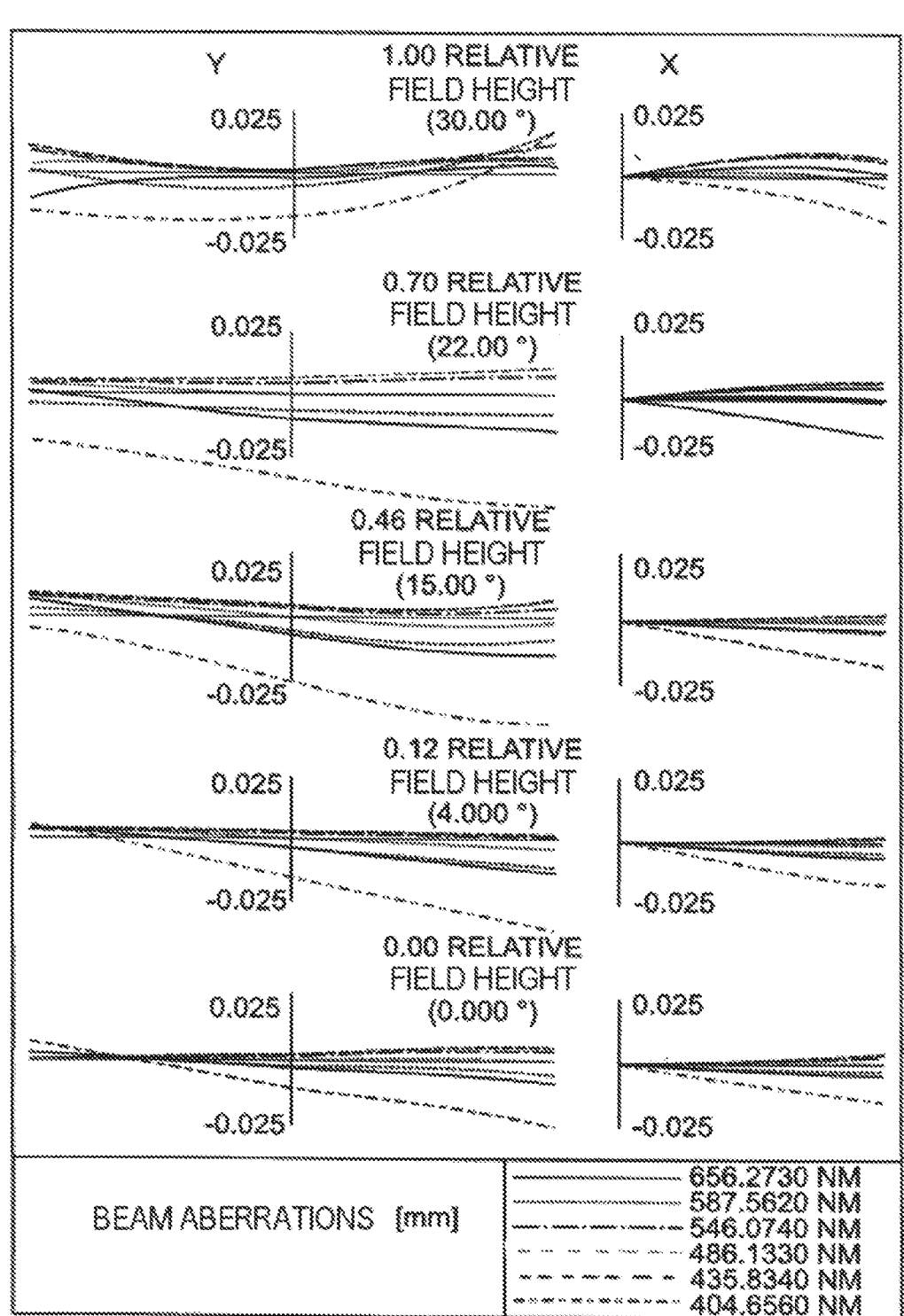
FIG. 12 shows a schematic representation of the transverse aberrations for an eye pupil with a diameter of 3 mm, laterally off-centered relative to the optical axis by 1 mm, in the case of an optical system according to FIG. 2.
Figure 13:
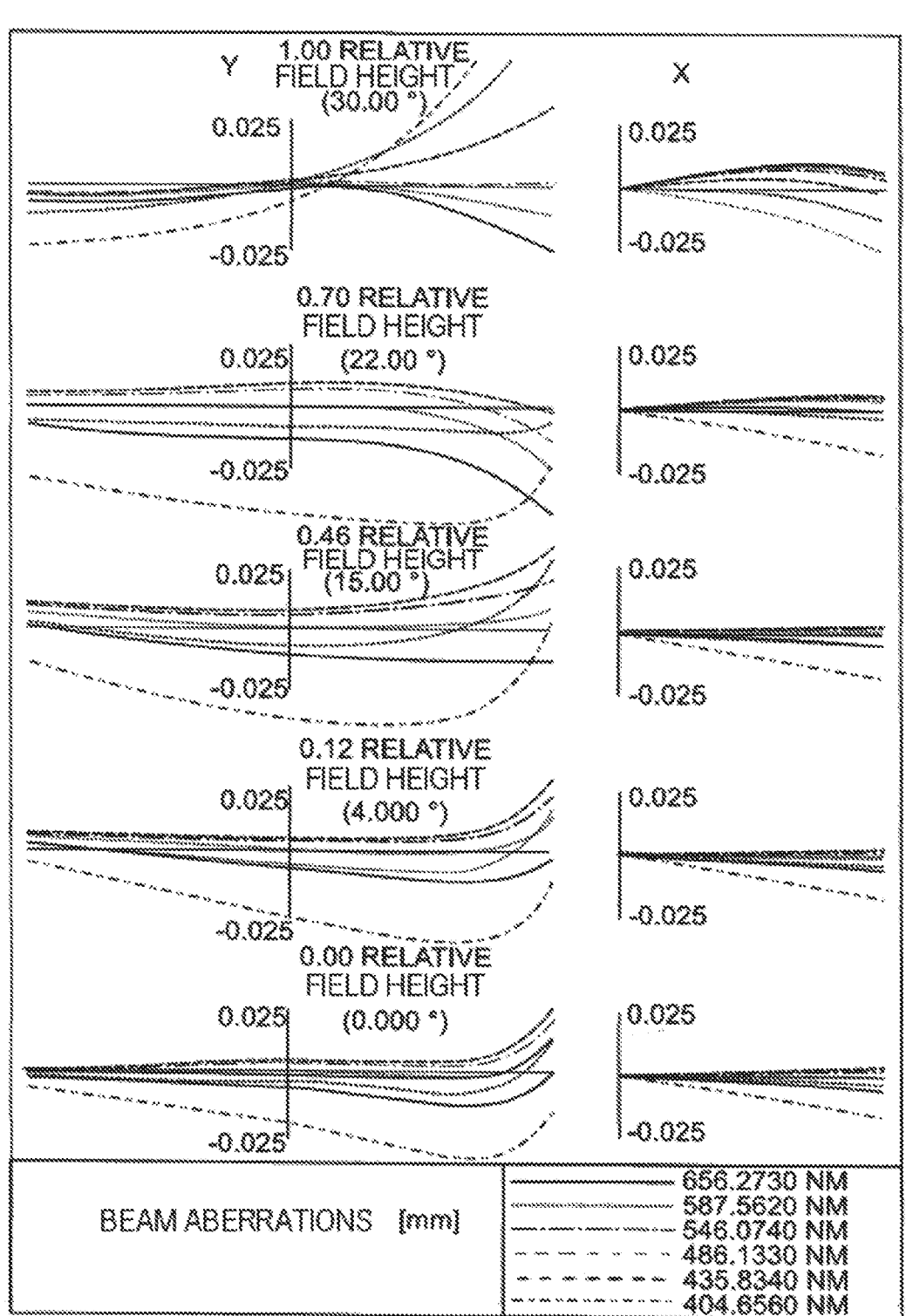
FIG. 13 shows a schematic representation of the transverse aberrations for an eye pupil with a diameter of 3 mm, laterally off-centered relative to the optical axis by 2 mm, in the case of an optical system according to FIG. 2.

For the optical system 7 according to an exemplary embodiment of the disclosure with a centered eye pupil with a diameter of 3 mm, FIG. 11 shows a schematic representation of the transverse aberrations. For the optical system 7 according to an exemplary embodiment of the disclosure with an eye pupil with a diameter of 3 mm off-centered relative to the optical axis OA by 1 mm, FIG. 12, by contrast, shows a schematic representation of the transverse aberrations. For the optical system 7 according to an exemplary embodiment of the disclosure with a position of the eye pupil with a diameter of 3 mm off-centered relative to the optical axis OA by 2 mm, FIG. 13 further shows a schematic representation of the transverse aberrations.

Figure 14:
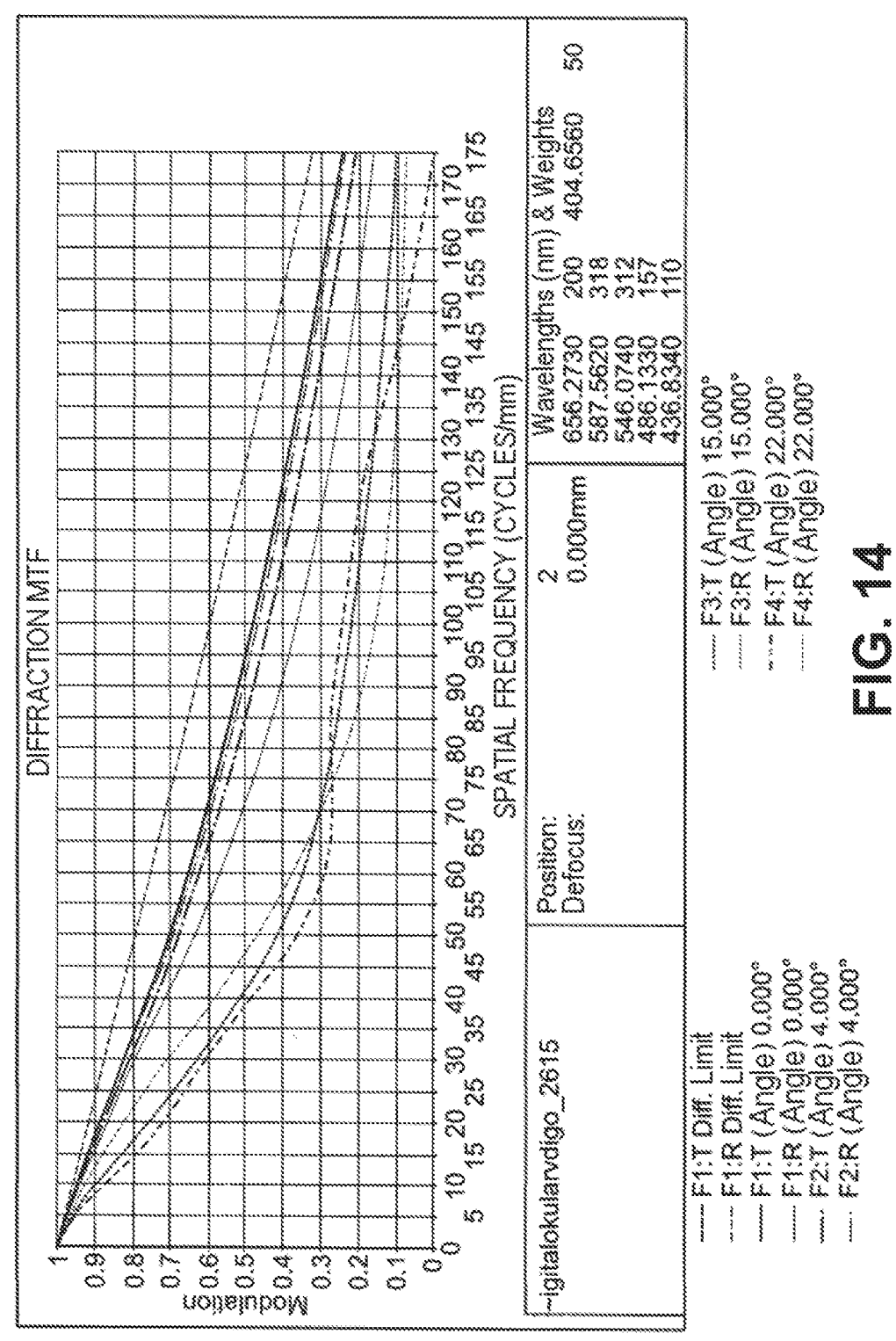
FIG. 14 shows curves of a modulation transfer function in the case of an optical system according to FIG. 2 with a centered eye pupil with a diameter of 3 mm.
Figure 15:
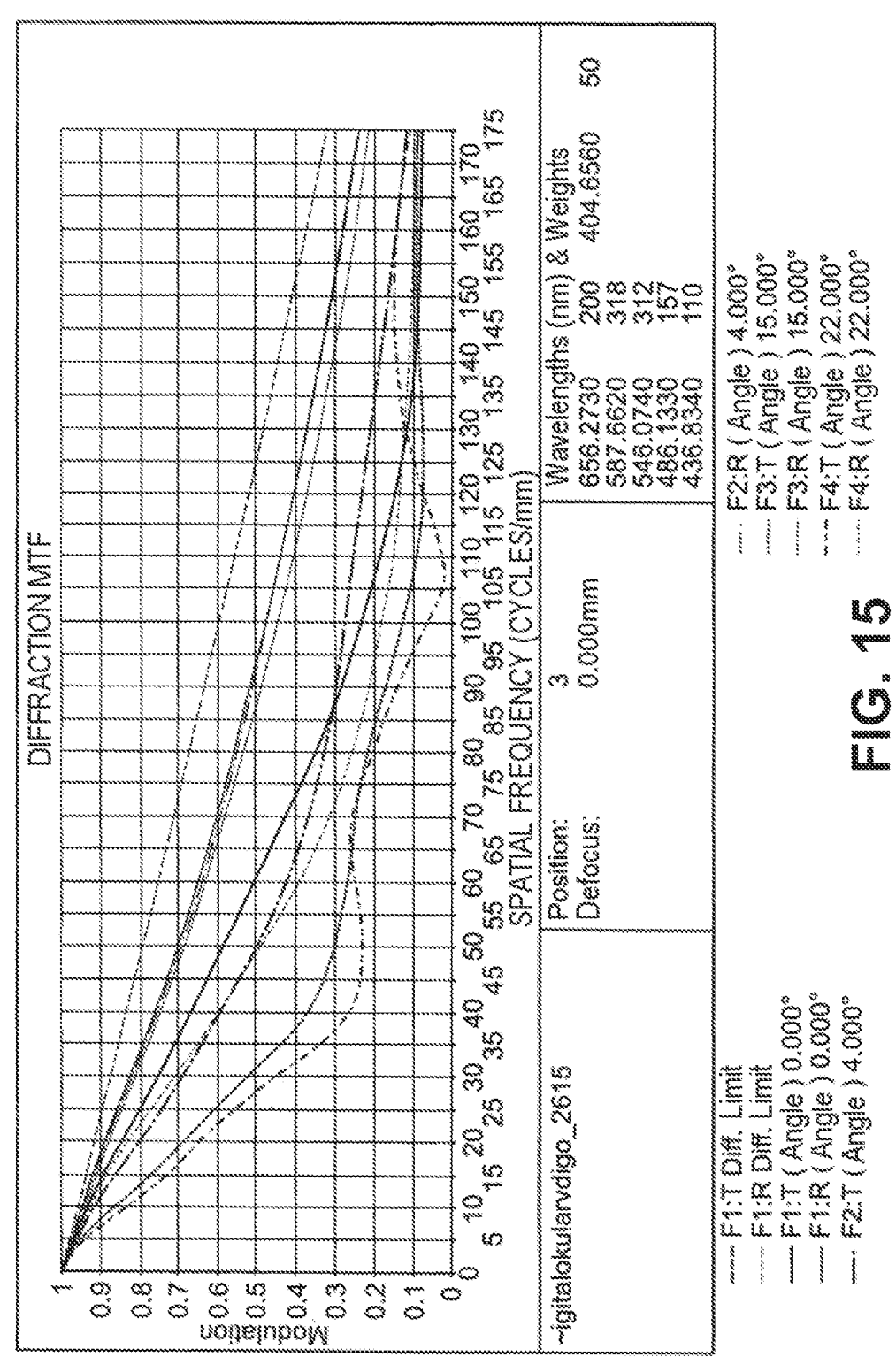
FIG. 15 shows curves of a modulation transfer function in the case of an optical system according to FIG. 2 with an eye pupil with a diameter of 3 mm, laterally off-centered relative to the optical axis by 1 mm.
Figure 16:
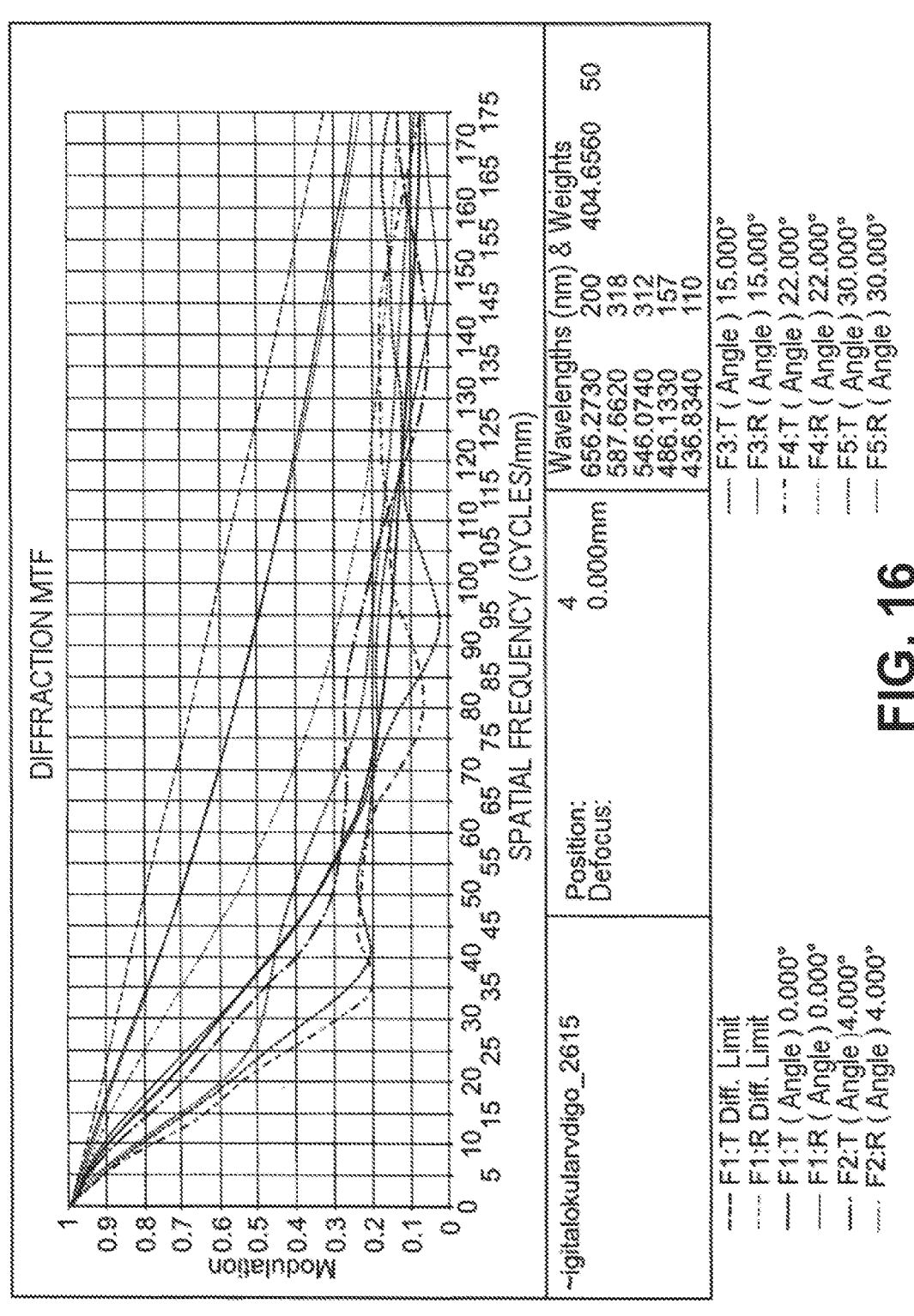
FIG. 16 shows curves of a modulation transfer function in the case of an optical system according to FIG. 2 with an eye pupil with a diameter of 3 mm, laterally off-centered relative to the optical axis by 2 mm.

FIG. 14 shows curves of the modulation transfer function (MTF) of the eyepiece 6 up to 80 line pairs/mm at the display unit 5 for different visual field angles for a centered eye pupil with a diameter of 3 mm. By contrast, FIG. 15 shows curves of the modulation transfer function (MTF) of the eyepiece 6 up to 80 line pairs/mm at the display unit 5 for different visual field angles for an eye pupil with a diameter of 3 mm laterally off-centered relative to the optical axis OA by 1 mm. Further, FIG. 16 shows curves of the modulation transfer function (MTF) of the eyepiece 6 up to 80 line pairs/mm at the display unit 5 for different visual field angles for an eye pupil with a diameter of 3 mm laterally off-centered relative to the optical axis OA by 2 mm.

In view of the use in field glasses, the eyepiece 6 may have a pincushion distortion of 5.3% at the edge of the visual field. This value of the distortion and the curve over the visual field have been chosen here such that the "globe effect" occurring in the case of lateral panning (cf. Publication by H. Merlitz, "Distortion of binoculars revisited: Does the sweet spot exist?", J. Opt. Soc. Am. A/volume 27, no. 1/January 2010) is minimized. The "globe effect" is a known and empirically well-validated effect, which is however still discussed in relation to its precise physiological and perception-psychological causes, in the case of which the visual impression of the observer would carry out a type of rolling movement on a spherical surface when a pair of field glasses are panned laterally, for example when inspecting the night sky. Observing what is known as the Merlitz condition, which is under discussion in the publication above, with an empirically determined Merlitz parameter of k=0.7, likewise discussed in the aforementioned publication, leads to a pincushion distortion of 5.3% to be used at the edge of the visual field for the specified visual field of +/−30°. This is observed by the exemplary embodiment of the optical system 7 according to an aspect of the disclosure under discussion here. Hence, the globe effect is avoided to the best possible extent.

The features of the exemplary embodiments of disclosure disclosed in the present description, in the drawings and in the claims may be essential for the realization of the disclosure in the various exemplary embodiments thereof both individually and in arbitrary combinations. The disclosure is not restricted to the described exemplary embodiments. It can be varied within the scope of the claims and taking into account the knowledge of the relevant person skilled in the art.

LIST OF REFERENCE NUMERALS

1 Digital microscope
2 Eye
3 Objective
4 Detector
5 Display unit
6 Eyepiece
7 Optical system
10 (First) drive unit
11 Second drive unit
20 First optical unit
21 Second optical unit
22 First free-form surface
23 Second free-form surface
24 First plane surface
25 Second plane surface
26 Immersion medium
27 Eye tracking device
B Spatial region (eye box)
E Unit
FE Filter unit
L Light incidence direction
L1 First lens
L2 Second lens
L3 Third lens
L4 Fourth lens
L5 Fifth lens
L6 Sixth lens
L7 Seventh lens L8 Eighth lens
L9 Ninth lens
L10 Tenth lens
L11 Eleventh lens
L12 Twelfth lens
L13 Thirteenth lens
L14 Fourteenth lens
LE1 First lens unit
LE2 Second lens unit
LE1A First lens unit
LE2A Second lens unit
LG1 First lens group
LG2 Second lens group
O Object
OA Optical axis
POS1 First position
POS2 Second position
WM Wavefront manipulator
ZB Intermediate image
ZP Intermediate pupil

What is claimed is:

1. An optical system, comprising:
a display or a digital display configured to display an image; and
an eyepiece configured to observe the image with at least one eye,
wherein the eyepiece defines a pre-definable spatial region such that the at least one eye is movable in the pre-definable spatial region without a pre-definable threshold value of an image quality of an image representation of the image produced by the eyepiece being undershot,
wherein, in a direction of the pre-definable spatial region starting from the display, the display is arranged first in a light incidence direction, followed by the eyepiece and then by the at least one spatial region,
wherein the eyepiece includes at least a first lens group and at least a second lens group,
wherein, as seen in a direction opposite to the light incidence direction, the first lens group is arranged first, followed by the second lens group,
wherein an intermediate pupil is arranged between the first lens group and the second lens group,
wherein the second lens group is configured to image the image displayed by the display into the intermediate pupil,
wherein the first lens group is configured to image the image arranged in the intermediate pupil into the spatial region,
wherein the intermediate pupil and the spatial region are conjugate to one another, and
wherein at least one of a filter and a wavefront manipulator is/are arranged at the intermediate pupil.

2. The optical system as claimed in claim 1, wherein the optical system has at least one of the following features:
(i) at least a first drive configured to move the filter, wherein the first drive is operatively arranged at the filter, and wherein the filter is configured to be movable such that the filter can be moved from a first filter position outside of the intermediate pupil to a second filter position at the intermediate pupil, and
(ii) at least a second drive configured to move the wavefront manipulator, wherein the second drive is operatively arranged at the wavefront manipulator, and wherein the wavefront manipulator is configured to be movable such that the wavefront manipulator can be moved from a first wavefront manipulator position outside of the intermediate pupil to a second wavefront manipulator position at the intermediate pupil.

3. The optical system as claimed in claim 1, wherein the filter is at least one of:
(i) an anti-aliasing filter,
(ii) an anti-aliasing filter including a birefringent plate,
(iii) an anti-aliasing filter including birefringent layers,
(iv) an apodization filter, and
(v) an optical spatial frequency filter.

4. The optical system as claimed in claim 1, wherein the optical system has at least one of the following features:
(i) the wavefront manipulator is a static wavefront manipulator,
(ii) the wavefront manipulator includes at least one lens unit,
(iii) the wavefront manipulator includes at least a first lens unit and at least a second lens unit, wherein the first lens unit has at least one of a first spherical power and a first cylindrical power, wherein the second lens unit has at least one of a second spherical power and a second cylindrical power, and wherein at least one of the following features is present: (a) the first spherical power is different from the second spherical power; and (b) the first cylindrical power is different from the second cylindrical power, and
(iv) the wavefront manipulator includes at least one phase plate.

5. The optical system as claimed in claim 1, wherein the optical system has at least one of the following features:
(i) the wavefront manipulator is an adjustable wavefront manipulator,
(ii) the wavefront manipulator includes at least one liquid lens,
(iii) the wavefront manipulator includes at least one elastopolymer lens,
(iv) the wavefront manipulator includes at least a first lens unit and at least a second lens unit, wherein the first lens unit is a first cylindrical lens unit, wherein the second lens unit is a second cylindrical lens unit, and wherein the first lens unit and the second lens unit are configured to be rotatable relative to one another.

6. The optical system as claimed in claim 1, wherein the wavefront manipulator is adjustable and includes at least a first optical unit and at least a second optical unit,
wherein the first optical unit and the second optical unit are arranged successively in the light incidence direction or in the direction opposite to the light incidence direction,
wherein the first optical unit and the second optical unit each are arranged such that the first optical unit and the second optical unit can be moved relative to one another in a movement direction perpendicular to an axis, and
wherein the first optical unit and the second optical unit each have at least one refractive free-form surface.

7. The optical system as claimed in claim 6, further comprising an immersion medium, wherein the immersion medium is at least one of:
(i) arranged between the first optical unit and the second optical unit, wherein the immersion medium is in contact with both the first optical unit and the second optical unit,
(ii) arranged between the first optical unit and the second optical unit, wherein the immersion medium is in contact with both the first optical unit and the second optical unit, wherein the immersion medium is a liquid, and (iii) arranged between the first optical unit and the second optical unit, wherein the immersion medium is in contact with both the first optical unit and the second optical unit, and wherein the immersion medium is an elastic optical cement.

8. The optical system as claimed in claim 1, further comprising an aperture, wherein the aperture is arranged at the intermediate pupil, and wherein the aperture trims beams emanating from the display.

9. The optical system as claimed in claim 8, wherein the aperture is a mechanical aperture.

10. The optical system as claimed in claim 8, wherein the aperture is at least one of:

(i) a circular aperture, wherein a size of the aperture is fixedly predefined or adjustable, and (ii) an elliptical aperture, wherein the size of the aperture is fixedly predefined or adjustable.

11. The optical system as claimed in claim 1, wherein the first lens group has an intermediate caustic.

12. The optical system as claimed in claim 1, wherein a first beam runs from a first location on the display in the light incidence direction, wherein a second beam runs from a second location on the display in the light incidence direction, and wherein at least 90% of the first beam and the second beam overlap at the intermediate pupil.

13. The optical system as claimed in claim 12, wherein the first beam runs from the first location on the display in the light incidence direction, wherein the second beam runs from the second location on the display in the light incidence direction, and wherein the second lens group is configured such that at least 90% of the first beam and the second beam overlap at the intermediate pupil.

14. The optical system as claimed in claim 1, wherein the optical system defines an optical axis, wherein the display is arranged on the optical axis, wherein the optical axis runs through the eyepiece, and wherein, as seen in the direction opposite to the light incidence direction, the first lens group is arranged first along the optical axis, followed by the second lens group.

15. The optical system as claimed in claim 1, further comprising at least one eye tracking device configured to determine a position of an eye pupil and a viewing direction of an observer.

16. An optical device having an optical system as claimed in claim 1, wherein the optical device is configured as at least one of a pair of field glasses, a refractor, a telescope, a light microscope, night vision equipment, digital-optical equipment for use in surgery, augmented reality equipment, virtual reality equipment, a digital microscope, and a digital surgical microscope.

17. The optical system as claimed in claim 1, wherein a first beam runs from a first location on the display in the light incidence direction, wherein a second beam runs from a second location on the display in the light incidence direction, and wherein at least 80% of the first beam and the second beam overlap at the intermediate pupil.

18. The optical system as claimed in claim 1, wherein a first beam runs from a first location on the display in the light incidence direction, wherein a second beam runs from a second location on the display in the light incidence direction, and wherein at least 70% of the first beam and the second beam overlap at the intermediate pupil.

19. The optical system as claimed in claim 17, wherein the first beam runs from the first location on the display in the light incidence direction, wherein the second beam runs from the second location on the display in the light incidence direction, and wherein the second lens group is configured such that at least 80% of the first beam and the second beam overlap at the intermediate pupil.

20. The optical system as claimed in claim 17, wherein the first beam runs from the first location on the display in the light incidence direction, wherein the second beam runs from the second location on the display in the light incidence direction, and wherein the second lens group is configured such that at least 70% of the first beam and the second beam overlap at the intermediate pupil.

* * * * *